(12) United States Patent
Grove et al.

(10) Patent No.: US 7,392,325 B2
(45) Date of Patent: *Jun. 24, 2008

(54) METHOD FOR HIGH-PERFORMANCE DELIVERY OF WEB CONTENT

(75) Inventors: Adam J. Grove, Menlo Park, CA (US); Michael Kharitonov, New York, NY (US); Alexei Tumarkin, Goleta, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/551,644

(22) Filed: Oct. 20, 2006

(65) Prior Publication Data

US 2007/0050521 A1 Mar. 1, 2007

Related U.S. Application Data

(63) Continuation of application No. 10/941,224, filed on Sep. 14, 2004, now Pat. No. 7,359,985, which is a continuation of application No. 09/534,321, filed on Mar. 24, 2000, now Pat. No. 6,820,133.

(60) Provisional application No. 60/188,601, filed on Mar. 9, 2000, provisional application No. 60/180,816, filed on Feb. 7, 2000.

(51) Int. Cl.
*G06F 15/16* (2006.01)
*G06F 15/173* (2006.01)

(52) U.S. Cl. .................... 709/238; 709/218; 709/227; 709/241; 709/249

(58) Field of Classification Search ................. 709/201, 709/219, 224–226, 238, 242, 243, 245
See application file for complete search history.

(56) References Cited

U.S. PATENT DOCUMENTS 6,141,325 A * 10/2000 Gerstel ...................... 709/242
6,243,760 B1 * 6/2001 Armbruster et al. ......... 709/243

(Continued)

*Primary Examiner*—Quang N. Nguyen
(74) *Attorney, Agent, or Firm*—David H. Judson

(57) ABSTRACT

The present invention provides a method and apparatus for increasing the performance of world-wide-web traffic over the Internet. A distributed network of specialized nodes of two types is dispersed around the Internet. A web client's requests are directed to a node of the first type chosen to be close to the client, and the client communicates with this node using a standard protocol such as HTTP. This first node receives the request, and communicates the request to a node of the second type chosen to be close to the request's ultimate destination (e.g., a web server capable of generating a response to the request.) The first node communicates the request to the second node using a different, specialized, protocol that has been designed for improved performance and specifically to reduce traffic volume and to reduce latency. The second node receives communication from the first node using this specialized protocol, converts it back to a standard protocol such as HTTP, and forwards the request to the destination computer or server. Responses from the destination to the client take the corresponding reverse route, and also are carried over a specialized protocol between the two nodes. In addition, these nodes can employ other techniques such as web caches that avoid or improve some communication steps. Thus, specialized, proprietary, or complex protocols and techniques can be quickly deployed to enhance web performance without requiring significant changes to the clients or servers.

10 Claims, 10 Drawing Sheets

U.S. PATENT DOCUMENTS

| | | | |
|---|---|---|---|
| 6,256,295 B1 * | 7/2001 | Callon | 709/238 |
| 6,415,329 B1 * | 7/2002 | Gelman et al. | 709/245 |
| 6,490,615 B1 * | 12/2002 | Dias et al. | 709/219 |
| 6,507,863 B2 * | 1/2003 | Novaes | 709/201 |
| 6,650,621 B1 * | 11/2003 | Maki-Kullas | 370/238 |
| 6,785,704 B1 * | 8/2004 | McCanne | 709/225 |
| 6,799,214 B1 * | 9/2004 | Li | 709/226 |
| 6,850,980 B1 * | 2/2005 | Gourlay | 709/226 |
| 6,873,616 B1 * | 3/2005 | Fedyk et al. | 370/357 |
| 6,892,235 B1 * | 5/2005 | Daude et al. | 709/224 |

\* cited by examiner

| IP ADDRESS | C-NODE | SERVER NAME | ESTIMATED DOWNLOAD TIME |
|---|---|---|---|
| 111.11.11.11 | NODE1 | WWW.SITE.COM | 5.6 |
| 111.11.11.11 | NODE2 | WWW.SITE.COM | 6.3 |
| 111.11.11.11 | NODE3 | WWW.SITE.COM | 8.9 |
| 222.11.11.11 | NODE1 | WWW.SITE.COM | 13.4 |
| 222.11.11.11 | NODE2 | WWW.SITE.COM | 7.2 |
| 222.11.11.11 | NODE3 | WWW.SITE.COM | 7.8 |
| 111.11.11.11 | NODE1 | WWW.OTHERSITE.COM | 8.4 |
| 111.11.11.11 | NODE2 | WWW.OTHERSITE.COM | 8.6 |

FIG.5

| SERVER NAME | S-NODE ADDRESS |
|---|---|
| WWW.SITE.COM | 189.12.34.56 |
| WWW.OTHERSITE.COM | 167.89.12.34 |

FIG.7

METHOD FOR HIGH-PERFORMANCE DELIVERY OF WEB CONTENT

CROSS REFERENCE TO RELATED APPLICATIONS

This is a continuation of U.S. patent application No. 10/941,224 filed Sep. 14, 2004, which is a continuation of U.S. patent application No. 09/534,321 filed Mar. 24, 2000, issued as U.S. Pat. No. 6,820,133, which claims priority from U.S. Provisional Patent Application No. 60/188,601 filed Mar. 09, 2000 and U.S. Provisional Patent Application No. 60/180,816 filed Feb. 7, 2000. The contents of these related applications are incorporated herewith by reference in their entirety.

FIELD OF THE INVENTION

The invention relates to communication between web clients, such as browsers, and web servers, where the communication is carried at least in part over the Internet or any other network layer in which performance criteria such as cost, bandwidth usage and communication latency are of concern.

BACKGROUND OF THE INVENTION

Today, improving the performance of Internet communication is a major technological and commercial concern. Investment in improving the Internet network infrastructure is estimated to become a $1.3 trillion dollar industry by 2003 (Source: Nortel Industries press release Jan. 31, 2000). It has been estimated that many web users will not tolerate a delay in downloading a web page of more than about 8 seconds, and that the current value of e-commerce sales at risk because of slow download speeds is $4.35 billion per year. (Source: Zona Research report "The need for speed", abstract available http://www.zonaresearch.com/info/press/99-jun30.htm). In this climate there is pressing demand for ways to improve web performance, and no simple or obvious techniques are overlooked.

Standard Internet Protocols: HTTP and TCP

Two standard protocols used on Internet links, HTTP and TCP, impose a significant limitation Internet communication speed. HyperText Transport Protocol (HTTP) is the application-level network protocol used when a client requests web content from a web server, and used by the web server when it responds to such requests. Modem network communication is layered, which means that higher-level protocols build on top of lower-level protocols (which in turn may build on other protocols). HTTP is a high-level protocol which includes commands to request content, respond with content, negotiate the form in which content is sent, and so forth. It is generally carried over the lower-level protocol Transmission Control Protocol (TCP). TCP enables reliable end-to-end connectivity between two locations in the Internet, but does not interpret the content sent between these two locations in any way: it just carries a stream of bytes. TCP in turn is generally carried over the Internet Protocol (IP), which is a packet-oriented protocol that does not guarantee reliable delivery.

It is well-known that HTTP and TCP are far from optimal protocols for Internet communication. TCP was developed and deployed well before HTTP was invented, and was designed for bulk bi-directional data transfer. HTTP is characterized by short request messages and moderate-length response transactions, and very bursty traffic. That TCP is not an optimal protocol for carrying HTTP is extensively documented. The paper "Modeling the Performance of HTTP Over Several Transport Protocols" in IEEE/ACM Transactions on Networking, vol. 5, number 5, October 1997, by Heidemann, Obraczka, and Touch, is representative of research addressing these issues. They claim, for instance:

These mismatches between the needs of HTTP and the services provided by TCP contribute to increased latency for most web users. Fundamentally, TCP is optimized for large-scale bulk data transport, while HTTP often needs a light-weight, request-response protocol.

The mismatches referred to here relate to a number of technical features of TCP, including those known as "three way handshake", "slow-start congestion avoidance", and "TIME_WAIT tear-down delays". The Heidemann, Obraczka and Touch paper discusses several such improved protocols, such as Transaction TCP (T/TCP) and Asynchronous Reliable Delivery Protocol (ARDP). Other defects in TCP as it relates to HTTP include the flow-control algorithm being used, which can lead to unnecessary traffic and delays in the event of noise or error on the network.

HTTP itself is an evolving, improving protocol, but it has recognized performance deficiencies even aside from the interrelationship with TCP. The PhD Dissertation "Addressing the Challenges of Web Data Transport" by V. N. Padmanabhan (Computer Science Division, University of California at Berkeley, USA; Also published as Technical Report UCB/CSD-98-1016 September 1998) discusses some of these. As an example, it explains how HTTP Version 1.0 (still in wide use today) requires a client to send one request at a time over a given connection, waiting for the response to arrive completely before continuing, and at considerable performance cost (as the dissertation proves).

The problem is not that protocols for Internet communication that are better than HTTP and TCP do not exist-or are not available. The problem is that HTTP and TCP are standards—widely accepted and widely deployed. Indeed, this is necessarily so, since communication over a shared network such as the Internet requires all users to use the same protocol. Thus, even when problems with existing protocols are noticed and improved protocols developed, it often takes a long time before such improvements become widely deployed. The delays are particularly long before improvements reach the public Internet infrastructure. In part, this delay is simply because costs are always large when significant software upgrades are needed. But in the case of protocol upgrades the costs and delays are even larger because no one can upgrade unilaterally: both ends of a network conversation must be using the same version of the same protocol. In the case of the Internet, some protocol changes require a community-wide coordinated update. For an example of such delays, consider that the problem with HTTP Version 1.0 cited above from Padmanabhan's dissertation was corrected in the next version of the protocol, where a feature known as "pipelining" was defined. Even several years after this improvement was first suggested there are very few web browsers that adopt it. Similarly, all proposals to replace TCP have languished, and today all major web browsers and web servers support HTTP over TCP only.

One prior art approach to improving Internet performance, without altering the standard protocols, is web caching. A similar approach is content distribution (CD). A Content Distribution (CD) network is a collection of specialized nodes or devices, placed in a larger network such as the Internet at chosen locations such as in the offices of Internet Service Providers (OSPs). These nodes store certain web content on behalf of the content distributors' customers. Such stores are sometimes called caches, mirrors, or repeaters.

A Content Distribution service includes a redirection or interception service. When a web user (using a client such as a browser) requests content from a site, and the content is known or suspected to be cached at one or more CD nodes, the request is directed (or comes to be redirected) to some CD node that is "close" to the user. The notion of closeness is a measure of communications performance, and in particular can use such metrics as bandwidth capacity, bandwidth cost, latency, security, administrative boundaries, administrative convenience, and current congestion on various network paths. The technologies for choosing a close CD node and then directing requests to the chosen node are varied, but the field is still new and there is still considerable ongoing innovation.

An alternative to redirection of the type just discussed is interception, in which a node is placed in the network path from the client in such a way that it gets to see all web traffic from the client. A web proxy or other specialized device such as a router, for instance located at the client's ISP, can be used for this purpose. In this case, the node intercepts all traffic and if it sees a request for content it has cached (or can readily fetch from a nearby cache) then it can return the content immediately, but otherwise it relays the traffic to its destination unchanged. The use of a proxy may be under the client's control (e.g., if the client must be configured to use a proxy), or be "transparent" if the client needs no such configuration.

The advantages of Content Distribution are the possibility of serving traffic to the user from a close CD node, thus getting the response to him faster, cheaper, with less bandwidth, and perhaps more reliably. It is common to see reports of up to 10× improvement in the speed at which content is served to the end user.

The major disadvantage of Content Distribution is that not all content is effectively cacheable. It is particularly inappropriate for dynamically generated content, but also ineffective for rapidly changing content and some rarely accessed content. A CD node typically stores images, video files, sound files, static text pages, and other such content which does not change much from user to user. Such content is kept on the CD server in anticipation of requests for it (or perhaps, if there has already been one request, in anticipation of additional requests). However, much content on the Internet is generated on-the-fly in response to a customer's request; for instance, generated by a server program using the Common Gateway Interface (i.e. A "cgi-bin" program). Since the output of such a program may never be the same twice, or at least be likely to differ from person to person and from occasion to occasion, it is generally not feasible to have such content prepared in advance. There are, after all, hundreds of millions of web users; one could not generate and store this many customized pages in advance. As web content becomes more personal and more customized to each user, the importance of such pages will increase further. CD networks cannot anticipate such pages and so generally cannot improve the speed at which they are served.

A second disadvantage of Content Distribution arises because even so-called "static" content, such as images and fixed text, may be subject to occasional change. It is important to ensure that the caching node or Content Distribution node do not serve "istale" content, i.e. content that is no longer in agreement with the definitive copy on the origin server. A variety of schemes are used to ensure that content is fresh, or to lower the probability of delivering stale content. The mature field of caching technology addresses such issues. However, by the nature of the problem there is no perfect solution to this problem. To illustrate the issues, consider that the most recent version of the web protocol, HyperText Transfer Protocol Version 1.1, includes support for caching and Content Distribution that works as follows. A node with a cache can send a short message to the origin server asking, in effect, whether the copy of a web object held by the cache is still up to date. If so, a short acknowledgment is returned to the cache. If the cache node or CD node always makes such an inquiry before delivering content to a client then there is no chance of delivering stale content. But there is a delay, possibly large, as the message is sent to the origin server and the response is received. This scheme may reduce the volume of traffic sent over the network (bandwidth consumption) but does not necessarily reduce the delay before the content is seen by the client (latency). Such tradeoffs are inherent to any caching or Content Distribution technology.

A third disadvantage of caching and Content Distribution technology is that it requires significant computer resources, since a cache keeps copies of web content just in case a client will request them. A cache may keep many objects that are not, in fact, ever requested by a client before they become stale, and these consume expensive resources such as memory or disk space. The problem is made worse by the fact that a typical Content Distribution network has numerous caching nodes. There are many techniques that alleviate this problem somewhat, e.g. by using advanced algorithms to carefully distribute cached content across a network of multiple caching nodes. However, the high resource requirement is mostly inherent to the technology and can only be reduced, but not eliminated, by such techniques.

The term "caching" (or "proxy caching") is sometimes used to refer to a technique related to Content Distribution. There are only slight technical differences. "Caching" is more often heard when interception technology is used rather than redirection technology. Second, nodes are more likely to be called caches if they are operated on behalf of the clients rather than on behalf of the content originators. A related technology is server-side caching (also known as "reverse proxying") in which a cache node is located near the server rather than near clients. This technology sometimes delivers smaller performance gains than conventional caching or Content Distribution, but can often be deployed at reduced resource cost because only one such node is needed.

All forms of caching share the first two of the disadvantages of Content Distribution described above, the most critical being the inability to handle dynamically generated content.

There is therefore a need in the art for an approach to improving the performance of Internet communication, particularly communication between web clients and web servers, which does not require significant computer resources and which is compatible with existing standard protocols.

SUMMARY OF THE INVENTION

The present invention is a method and apparatus for increasing the performance of network links by using a standard protocol to transmit a message from a source to a first specialized node, using a high-performance protocol between the first specialized node and a second specialized node, and then using a standard protocol between the second specialized node and a destination.

Thus, the invention advantageously provides accelerated delivery of dynamically generated and non-static content, as well as static content. It allows the use of a variety of improved protocols over the link between the two specialized nodes. At the same time, the invention advantageously avoids any requirement to change to the standard protocols used by the source and the destination. It offers significant Internet performance gains, can be deployed at relatively modest cost in a short period of time, and needs neither major infrastructure changes nor changes to end-user or server software.

BRIEF DESCRIPTION OF THE DRAWINGS

FIG. 5 is an illustration of a data structure used by a selector in accordance with one embodiment of the invention.

FIG. 7 is a data structure used by a C-node in accordance with one embodiment of the invention.

DETAILED DESCRIPTION OF THE INVENTION

Figure 1:
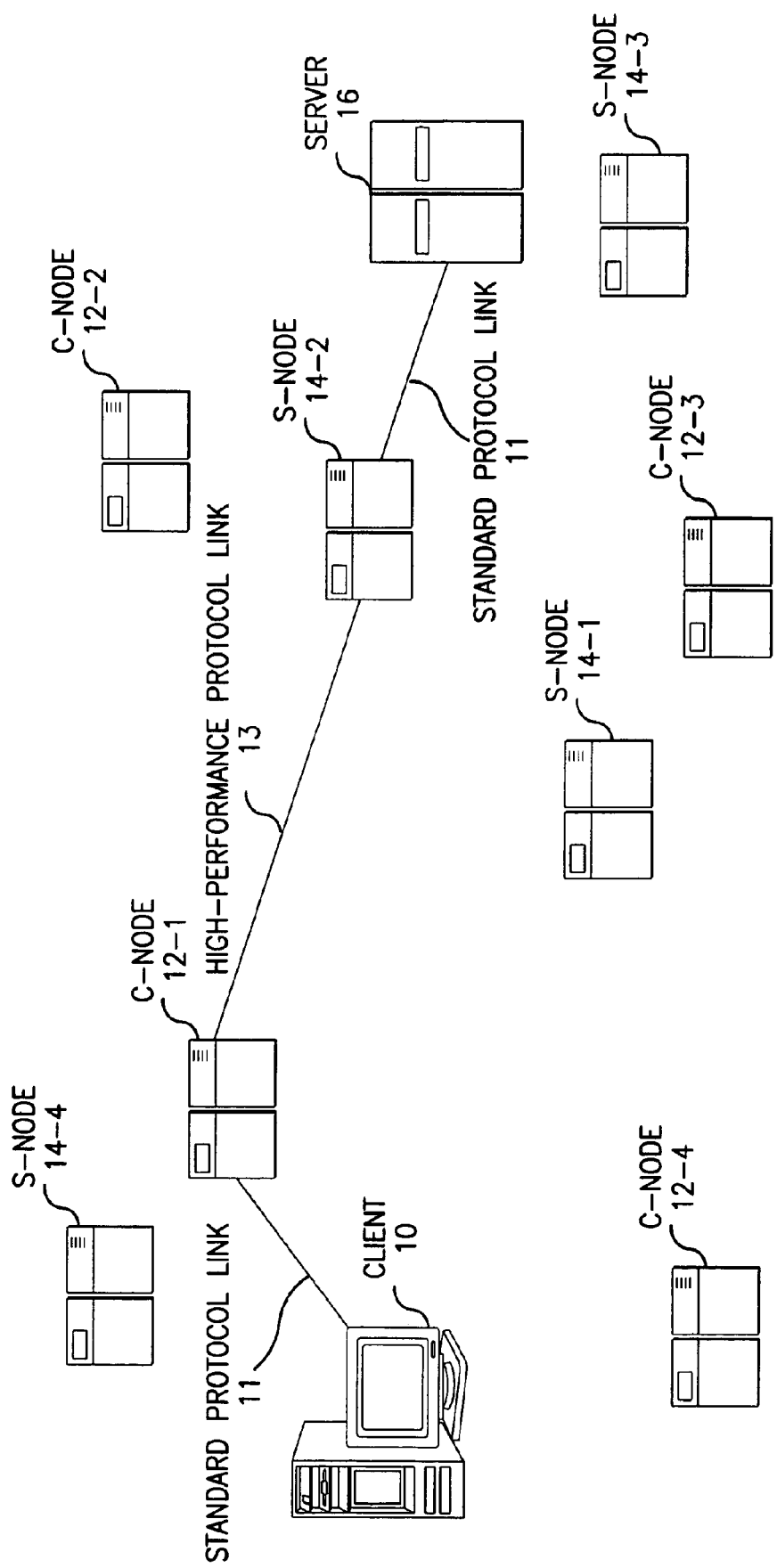
FIG. 1 is a block diagram of a system for providing improved communications performance in a network in accordance with one embodiment of the invention.

A General Description of the Method and System: Client Nodes ("C-Nodes") and Server Nodes ("S-Nodes")

The present invention comprises specialized nodes that are deployed at two or more locations throughout the Internet, with the capability to communicate with one another using a high-performance protocol and to select other specialized nodes for communication. In a preferred embodiment, such specialized nodes are located close to web servers and clients. It will be appreciated that the term "close" encompasses a variety of communications performance measures, such as network distance, current network conditions, and individual node capability. In particular closeness can be based on such metrics as bandwidth capacity, bandwidth cost, latency, security, administrative boundaries, administrative convenience, and current congestion on various network paths, or a combination of such metrics. The specialized nodes are used to communicate information, for example in packet form, from a source, such as a client, to a destination, such as a server.

If the entire communications path for a given packet transmitted from a source to a destination (or in the reverse direction) is called a "link", it may be desirable to optimize some measure of communications performance, which takes into consideration one or more metrics, for that link. Alternatively, it may be desirable to optimize communications performance only for one or more sub-links within that link, for example, for the sub-link from the first specialized node to the second specialized node, or for the sub-link from the source to the first specialized node in combination with the sub-link from the first specialized node to the second specialized node.

It will be appreciated that "optimization of a measure of communications performance" does not imply optimization in a strict mathematical sense, and may broadly take into account such metrics as bandwidth capacity, bandwidth cost, latency, security, administrative boundaries, administrative convenience, and current congestion on various network paths, and is not limited to the fastest, shortest or lowest cost path. For example, under some circumstances, the "optimal" path may be selected based on a combination of limiting round-trip time while taking account of administrative convenience—such a path may be far from "optimal" in a strict mathematical sense but still optimal for the purposes of this invention.

It will be appreciated that the measure of communications performance to be optimized for one sub-link may differ from the measure of communications performance for another sub-link in the same link. For example, where caching is used, the probability that the requested web content may be in a particular cache, along with the network distance from that specialized node to the server, may be used to determine an "optimal" path. It will further be appreciated that a measure of communications performance may be a combination of other measures of communications performance, and this combination may be made in many ways: for example the combination may be a weighted sum. The combination may be a combination, such as a weighted sum, of performance measures for different sub-links in a link, or of different metrics such as distance and bandwidth for a single sub-link, or of combinations of different metrics for different sub-links.

In addition to the specialized nodes described above, the system and method may also comprise a redirection system or process, one or more selection systems or selection processes ("selectors") and one or more network monitoring and mapping systems or processes ("mapping devices"). In order for a client to send an Internet message, such as a request for web content, or a "world wide web message," to a server, a selector may be used to select one node, e.g. a C-node, which may be near the client or chosen to optimize some other characteristic or measure relevant to commnunications performance. It will be appreciate that the C-node may be selected from a group of candidate C-nodes, which may be a subset of all the C-nodes. Often, therefore, the selector will need to have access to information about network performance characteristics, such as degree of network closeness between certain nodes and devices, in order to make its selection. A separate mapping device may be responsible for collecting, analyzing and collating such information and making it available in a form usable by the selector. Once the selector has chosen the C-node to be used, a redirection system may be required to ensure that certain messages from the client do in fact get directed to that C-node, instead of traveling directly to the server. When the C-node receives a message from the client, it must send it to a second node which may be near the target server, e.g. an S-node. The S-node then communicates the message to the server. If there is a response from the server, it typically travels the reverse route to the S-node, then to the chosen C-node, and then to the client. The response from the server, as well as the request for web content, may be termed a "world wide web message," or, more broadly, an Internet message.

The C-node may need to choose the S-node from among a set of more than one possible candidates, in order for the message to ultimately reach the desired server. If such a choice is necessary, the C-node may use a second selection system or process to choose the S-node. The choice of S-node is then provided to the C-node by the second selection system or process. If the second selection process is used, it could be distinct from the selection process or selector initially used to select the C-node. If means for a second selection process are physically separated from means for the first selection process, the selection of S-node must be communicated, for example over the network, to the C-node by the second selector. Alternatively, the initial selection, described above, may include selection of both the C-node and the S-node, and not merely the C-node. The choice of S-node must be provided by the selector to the C-node, either through the redirection system or in another fashion, so that the C-node knows where to forward messages from the client.

The initial selector, in some embodiments, may select both the S-node and the C-node, but be unable to communicate the S-node selection to the C-node. In such embodiments, the second selector or selection process will essentially re-determine the S-node selection using the same information as the initial selection process, so that the correct C-node and S-node pair is used. This permits the selection of both nodes to optimize certain characteristics of the overall link—for example, minimizing total transmission time from the source to the destination—even where it is not practical to transmit the selection of the S-node to the C-node.

In another aspect of an embodiment of the invention, the selector choosing the C-node bases its choice on a combination of factors, including the probability that the chosen C-node has the requested object in cache and communication performance measure including a measure for at least one sublink in the link from C-node to server. For example, one may estimate both the network distance from client to C-node, plus the distance from C-node to server, where the latter figure is weighted by the probability that the C-node does not have the requested object in cache. Selecting a C-node on this basis may optimize expected communication time averaged over all objects, including those not in cache. This aspect can be used even if the communication from C-node to client does not pass through an intermediate S-node, and where this communication uses standard protocols. That is, this embodiment is of use even when the principle function of the C-node is simply as a cache.

It will be appreciated that these functions—selection, mapping and redirection—may be located in separate devices or processes, or may be combined. For example, selection and mapping may be performed by separate devices, with the selector receiving information from the mapping device. Or, selection and mapping may be performed by the same device. Moreover, a specialized node may be co-located with a client or a server, for example where a web proxy is used for redirection.

A redirection system is preferably used to direct certain traffic from the client to the selected specialized node (the C-node). The selected node near the client may select a second specialized node near the target server, e.g. an S-node, if no such node has been selected in the initial selection process or system, or if the selection of such second specialized node has not been communicated to the first specialized node (the C-node). The first specialized node uses a high performance protocol to communicate with the second specialized node. The second specialized node then uses a conventional web protocol to communicate with the target server. In one aspect, the invention divides the end-to-end communication into three distinct steps, or sub-links, each way—i.e., client to C-node, C-node to S-node, S-node to server (and correspondingly reverse steps for the response)—such that the first and last steps which use standard and possibly inefficient protocols are short (using conventional network distance metrics), and the intermediate step uses optimally efficient protocols.

It will be appreciated that the sub-link between the C-node and the S-node may be a dedicated high-performance sub-link, such as fibre optic or ATM. Even where a dedicated sub-link is used, the communication is considered as taking place "over the Internet," because the communications from the client to the C-node, and from the server to the S-node, would still take place over the Internet. Thus, "over the Internet" should not be interpreted as requiring every sub-link in the end-to-end communications link to take place over the Internet.

In one embodiment, shown in FIG. 1, the invention comprises a distributed network of specialized nodes, located at various points in the Internet. Unlike conventional Content Distribution systems, the invention calls for two types of nodes, C-nodes 12 and S-nodes 14. The invention operates when a web client 10, for instance, a person using a browser, issues a request intended for some web-site that the invention is configured to manage, or alternatively issues a request for a particular web object that the invention is configured to manage. In the following discussion, the client 10 is the user or device requesting the content, and the server 16 is the origin server containing or generating a definitive copy of the content and that would normally be responsible for delivering the content to the client 10.

The invention preferably employs a selection means to identify some C-node 12 that is close to the client, in terms of any standard network cost or distance metrics, and means of ensuring that the client's request is directed to the chosen C-node 12-1. Alternatively, the invention may use means to ensure that all traffic from the client 10 passes through some close C-node 12 and is subject to possible interception by that node. Means similar to those used for Content Distribution or caching can be employed: for example, a web proxy could be used.

It will be appreciated that, where a C-node must be selected, the choice of C-node 12 may depend on a variety of factors other than, or in addition to, a measure of network distance between the C-node 12 and the client 10, such as factors relevant to performance or predicted performance. An example of such other factors is any measure of communications performance between the C-node 12 and the server 16 (not necessarily using the same metric used for measuring client 10 to C-node 12 distance). In this example, one might combine the network distance from client 10 to C-node 12 with the network distance from C-node 12 to server 16 in order to estimate the total communication time for a request to travel from the client 10 to the server 16 (i.e. when the request is sent through the C-node 12, and employing all other components of the invention) and for the response to return. In this example, this total estimated communication time is the determinative communications performance measure for C-node selection, and possibly also for S-node selection.

In general, the choice of C-node 12 and S-node 14 may depend on characteristics of the entire communication path or link involving all four entities: client 10, C-node 12, S-node 14, and server 16. Alternatively, one or more sub-links of the path, such as the sub-link from the C-node 12 to the S-node 14, may dictate the choice of C-node 12 and S-node 14. Thus the invention may employ means that evaluate such characteristics and chooses among C-nodes 12 (and possibly also S-nodes 14) in order to optimize some desired performance characteristic.

Whichever selection means and criteria are used, the redirection means are then employed so that the chosen C-node 12-1 receives the request. All conmnunication between the client and the C-node 12 over link 11 will use network protocols of the client's choosing, and hence will typically be a standard widely deployed protocol. Today, for web traffic this will usually be HTTP Version 1.0, HTTP Version 1.1, or some intermediate protocol that uses some but not all features of HTTP 1.1, and any such version of HTTP will today generally be carried over TCP. Other protocols, for example Wireless Application Protocol (WAP) and Secure Sockets Layer (SSL), may also be used. This aspect of the invention is not limited to any specific protocol, but may be used whenever a lower-performance standard protocol is in use in a network and higher performance is desired. It will be appreciated that "protocol" may refer to a single protocol, such as HTTP, or may refer to multiple layered protocols, such as HTTP over TCP over IP.

If the C-node 12 has the requested object in its optional cache or database, it may return the object directly to the client 10 and thus may function as a conventional web cache or content distributor as well as a specialized node capable of using high-performance protocols. If the C-node 12 does have such a cache or database, the selection means and criteria used to select C-node 12 may include an estimate of the probability that C-node 12 has the requested object in its cache. In addition to conventional caching functionality, the C-node 12 can maintain a database that keeps track, for every web site and web object it is configured to manage, of the identity of an S-node 14 that is determined to be close to the corresponding 'server for that site or web object, permitting the C-node to select the S-node. For current systems, the identity is likely to be in the form of an IP (Internet Protocol) address or an Internet Domain Name for the S-node. Alternatively, the C-node 12 can employ other means to determine the identity of a suitable S-node 14, for instance by using a selector or selection process (not shown) responsible for selecting S-nodes 12.

The C-node 12 communicates the client's request to the chosen S-node 14 over link 13, using a specialized protocol designed to be of higher performance than the prevailing standard protocol used by the client. Communication between C-nodes 12 and S-nodes 14 may be achieved using techniques similar to those used for protocol tunneling. For instance, since HTTP/TCP is a packet or datagram oriented protocol, the C-node 12 may "encapsulate" the packets it receives into high-performance packets using a "wrapper", and the S-node 14 can remove the wrapper to recover the original packet, which may then be relayed to the server using HTTP/TCP.

It will be appreciated that, since C-nodes and S-nodes are closely coupled, innovative protocols can be used without requiring the rest of the network, such as the Internet, to adopt them. For example, since C-nodes and S-nodes have a specialized purpose, they can use protocols that, for reasons of complexity, for example, or large memory requirements, could never be deployed widely in web clients or servers. One skilled in the art will appreciate that many such optimized or high-performance protocols are known, although many have not moved beyond the research laboratory. This aspect of the invention is not specific to any particular C-node to S-node protocols, and anticipates further developments in this area. One skilled in the art will appreciate that no matter how the state-of-the-art in widely deployed, standardized, protocols evolves there are always likely to be better protocol innovations in the research pipeline that the invention could be using. In the section entitled "Internode Protocols and Techniques," below, some preferred optimized protocols are described, and another aspect of the invention, comprising enhancements to the described protocols, is disclosed.

Many enhanced protocols between C-node and S-node can be carried over the public Internet Infrastructure, as is true for all the examples given in the section entitled "Internode Protocols and Techniques," below. However, as discussed above, traffic between C-nodes and S-nodes can also be carried on a private network, for instance one designed for higher-performance communication than the public network. Because traffic between C-nodes and clients, and S-nodes and servers, is carried over the Internet, the communications are still referred to as Internet messages, carried over the Internet, even though part of the link between the client and the server may be over a private network.

Returning to FIG. 1, the chosen S-node 14 receives the request from the C-node 12 over link 13, using the specialized high-performance protocol. The S-node 14 may find the requested content in its own optional cache (or in a cache to which it has access), or else may need to contact the server 16 to obtain it. In the latter case, the S-node 14 may communicate with the server 16 over link 15 using a protocol of the server's choice, which today will typically be a version of HTTP over TCP. In this latter case, the S-node 14 retrieves the response from the server 16 over link 15. In either case, the S-node 14 can forward the response back to the originating C-node 12 over link 13 using a specialized, high-performance protocol. The C-node 12 will then communicate the received response back to the web client 10 using the client's chosen standard protocol over link 11.

In a preferred embodiment, the client 10 to C-node 12 distance is minimized. It will be appreciated that this will often maximize the gain to be had in deploying better protocols over the high speed link 15. The present invention advantageously accomplishes this by deploying S-nodes 14 close to web servers 16 and C-nodes 12 close to clients 10.

Thus, significant benefits are realized by dividing the client-to-server end-to-end transaction into three parts: a first part comprising a client-to-C-node portion, a second part comprising a C-node-to-S-node portion, and a third part comprising an S-node-to-server portion. The C-node is generally a relatively short network distance from the client and uses a widely deployed conventional protocol (preferably HTTP over TCP) to communicate with the client. The S-node is generally a relatively short network distance from the server and uses a widely deployed conventional protocol (preferably HTTP over TCP) to communicate with the server. The C-node and the S-node use a high performance protocol (preferably one or more of those described in "Internode Protocols and Techniques," below), to communicate with each other.

In another aspect, the present invention deploys a network of C-nodes and S-nodes and then selects a specific C-node and an S-node with the goal of maximizing a measure of network performance between client and server. By selecting C-nodes and S-nodes based on proximity, most of the advantages of locating tunneling nodes right at the client and server are gained, but the client and server do not need any modification. It is another important advantage of the invention that it can be deployed without any changes in the client or server machines or to their software, and thus can reduce the cost and time before advanced protocols are deployed.

Details of the Method and System: C-Nodes, S-Nodes, Selection, Redirection, Mapping, and Specialized Protocols The invention comprises a distributed collection of specialized computers or network nodes, C-nodes and S-nodes. One skilled in the art will recognize that the functionality of both node types may be present in a single physical device. As discussed below, certain embodiments of the invention include other components in addition to C-nodes and S-nodes. These nodes may also be embodied as computer software executing on a general-purpose computer that also serves other purposes, or may be embodied as a tightly coupled cluster of computers.

C-nodes are distributed throughout the network with the intent that most Internet users will be close, in network terms, to at least one C-node. In particular, C-nodes may be placed on Internet Service Providers' (ISP) premises, on large corporate networks, on Internet backbone networks, and elsewhere, Correct operation of the invention does not depend on how well the C-nodes are located, although the benefits that are delivered by the invention may depend on this.

The Selection System

In a preferred embodiment, the invention includes or uses means, or a selector, for selecting a C-node that is close to the source of the request, a client. The selector may also select an S-node that is close to the destination of the request, a server. It will be appreciated that the server may serve as the source of an Internet message, for example web content, and the client may serve as the destination for the Internet, or vice-versa. The notion of closeness used can include any combination of such metrics as bandwidth capacity, bandwidth cost, latency, security, administrative boundaries, administrative convenience, current congestion on various network paths, and geographic proximity, although other factors may also be taken into account. However, correct operation of the invention does not depend on which notion of closeness is used or how close the chosen C-node actually is.

The selection system may take into account other factors in addition to, or instead of, the network proximity between the client and the C-node. This may be because other factors concerning the C-node may also be relevant to the performance attained. As an example, consider a client that is a very short network distance from one C-node, and this C-node is connected to a first Internet backbone network. The client in this example is also a somewhat larger, but still short, network distance from a second C-node that is connected to a second, different, Internet backbone network. It may be that the client wishes to retrieve web content from a particular server, and it is known that this server (and/or the closest S-node to the server) is well-connected to the second Internet backbone network but not to the first. Today, so-called "peering points" where traffic crosses from one backbone to another are common causes of network traffic delay. In this case, one may wish to select the second C-node rather than the first, and thus avoid having to cross backbones. This may be the case even though the first C-node is somewhat closer to the client that the second. So, in this example, the additional factor of backbone connectivity may usefully be taken into account when choosing C-nodes.

As a second example of such other factors, one may directly combine the estimated distance between client and C-node with the estimated distance between C-node and server, in a fashion that estimates what the total communication cost or time for a typical transaction between the client and server would be, if it were sent by way of the C-node and using all other components of the invention. As a third example of other such factors, one may monitor the current load on each C-node and prefer a lightly loaded C-node that may be somewhat further away than another, more heavily loaded, C-node. As a fourth example of such other factors, one may give additional preference to a C-node that is more likely to have the requested content in its cache.

In some embodiments, selection may be inherently performed by the redirection system. In other embodiments, a selector may use information obtained from a mapping system to select a C-node or an S-node, or both. As discussed above, a C-node may be selected by a selector, and an S-node by another selector. The C-node must be provided with the S-node selection, in order to transmit to the S-node. Therefore, if the S-node is selected by a separate selector, the selection must be communicated to the C-node. This may be done by the client, for example, or by the selector. Alternatively, a single selector may select both a C-node and an S-node, which allows the selector to take into account characteristics of every sub-link in the link from the source to the destination, if desired.

The Redirection System

In a preferred embodiment, the invention includes or uses means, called herein a "redirection system," such that certain web traffic, including requests for web content, is communicated to a selected C-node instead of being communicated directly to the server that would ordinarily deliver such content. The redirection system arranges for traffic to be sent to the selected C-node, which is chosen to be close to the client or chosen by other similar performance-relevant criteria, and then intercepted by such a C-node. In some circumstances, the redirection system performs the functions of the selection system as well as providing redirection.

The following alternative embodiments of the redirection system are provided as examples. However, this list is not intended to be exhaustive and the invention contemplates other means that can be used instead. Furthermore, as one skilled in the art will appreciate, many combinations or variants of methods in the following list can serve as redirection means.

Web Proxy Serving

Most web clients can be configured to use aproxy. When so configured, the client sends requests to the designated proxy, rather than directly to the source of the requested content (e.g. to the web server containing the content). The proxy then obtains the information on the client's behalf, and then forwards this response back to the client. Client configuration can be done manually (i.e., the user sets parameters in his browser), automatically (e.g., the browser downloads configuration settings including proxy settings from a known location), or may be fixed into the client code. A client may go to the same proxy for every request, or may make the decision as to whether to use a proxy (and if so, which proxy) on a request-by-request basis. Thus, if a proxy is used, in some circumstances the C-node is not "selected," at least not dynamically, and the redirection system for this example thus includes any selection of the C-node as well as redirection.

It will be appreciated that human judgment or a computer program can be used to determine the address or name of a close C-node based on the location or relative distance of the client. Then, using either manual or automatic configuration, the client is configured to use the C-node as its proxy for appropriate web traffic.

Transparent Network Interception.

A specialized computer or network element such as a router may be located in the network in such a way that traffic from certain clients passes through this node. This node can run hardware or software that inspects all outgoing traffic, and can make a decision for each packet or traffic stream as to whether such traffic passes unhindered on its normal route, or else whether the packet is intercepted for special processing.

The node is configured to intercept web requests and other traffic that should be handled by the invention. In order to be able to see all traffic from the client, the intercepting node will generally have to be close to the client (for instance, on the same machine as the client, the same physical network as the client, or at the client's ISP). Thus, a node configured to intercept such traffic can serve as a C-node.

A variant of this interception system occurs when the intercepting node is not itself a C-node, but has the ability to send selected traffic to a nearby C-node, e.g. using IP routing and/or encapsulating the IP packets then forwarding them to the C-node. In this case, various means can be used for the intercepting node to know the identity of the nearby C-node. For instance, the name or IP address of the nearest C-node may be fixed into the intercepting node, or stored in a database accessible to the intercepting node. Alternatively, the intercepting node may query a specialized computer or system that analyzes network distances and can identify a suitable C-node.

DNS Redirection.

When a client issues a web request, it generally identifies the server for the request by its domain name, such as "www.someserver.com". Specialized network elements exist that map such names into network addresses, which in the Internet are generally numeric Internet Protocol (IP) addresses. The Internet routing infrastructure locates computers and network elements based on IP address. The most common service in use today for mapping names to network addresses is called the Domain Name System, or DNS. However, there may arise various competing directory services with a similar purpose, and the subsequent discussion could be applied to such services as well.

Usually DNS is configured to return the actual address of the web server. However, it may be configured to return the address of another computer or network node. In such cases, traffic intended for the server will in fact arrive at the other node instead. This may however be acceptable so long as the other node can function correctly in place of the intended server, or is able to forward the traffic onwards to the intended server.

Redirection can be achieved by having DNS map the name of the server to the address of a closely located C-node rather than to the address of the server itself. In this context, it is important to note that the DNS system does not need to return the same address to every query that it receives for a particular name. Since the DNS can determine the IP address of the requester (which may itself be another DNS server), it can be configured to return an address that can differ depending on the requesting client, and in particular can identify a node close to that client. There are several specific ways of configuring the DNS system or writing DNS software in order to return the IP address of a C-node that is likely to be close to the requesting client, and these techniques are known to those skilled in the art.

DNS Redirection Using Dedicated Domain Names.

A variant of DNS redirection involves using a new domain name, such as "www.cnode.com" or "www.someserver-cnode.com", that is distinct from the server's domain name. The DNS system is configured to return a different IP address for this new name depending on the requesting client, such IP address identifyg a C-node. close to the client. In this approach, the actual server keeps its original name, for instance "www.someserver.com", and DNS maps this name to server's correct IP address (and not to a C-node's address).

When the server delivers content, the content may contain references to yet other web objects. In particular, pages in HyperText Markup Language (HTML) can contain references to other objects held on the server or elsewhere. In this variant of R4, the server can refer to an object using its own name (e.g. if the object is called "home.html" and the site is named "www.someserver.com", the URL may be "HTTP:// www.someserver.com/home.html") if it does not want the object to be handled by the invention, and can refer using the new name (e.g. "HTTP://www.cnode.com/someserver/home.html" or "HTTP://www.someserver-cnode.com/home.html") in order to have such content handled by the invention.

One advantage of this method is that a DNS lookup request providing the web server's name will receive the server's true address in return.

HITP Redirection.

Versions of the HTTP protocol include various "redirection" commands and responses. When a client requests content from a site, it may receive a response that does not include the requested content, but instead names an alternative location where the content can be found. These will be referred to as HTTP redirection responses. Most web clients are configured to automatically go to the suggested location without needing additional user feedback.

To use HTTP redirection as part of the invention's redirection mechanism, a request will initially be sent to a fixed destination, which may be the server itself or else some other specialized node, but which has not necessarily been chosen to be close to the client or according to performance-related criteria. This node can use the address of the requesting client to select a C-node that is near to that client, and then HTTP redirect the client to use that C-node. This selection can be done by the server itself, running software for this purpose, or the server can query another specialized computer. A variant of this method is that request is initially sent to the server, which HTIT1 redirects the request to another specialized computer that is capable of selecting a C-node, and then this specialized computer performs a second HTTP redirection to the chosen C-node.

HTTP Redirection and URL Rewriting.

This redirection system and method is a variant on HTTP Redirection. When a request has been redirected to some C-node, the C-node will be responsible for returning the response to the client. If the response is HTML, and contains references to other objects (URLs), these references may contain the domain name of the original server.

The C-node may modify the HTML to replace the name of the server with the C-node's own name or IP address. In this fashion, if the client later decides to request one of the referenced objects, the request will automatically be sent directly to the C-node rather than having to incur the overhead of redirection.

Network Mapping and Other Means Used for Selection

The redirection methods discussed above are possible means by which Internet traffic intended for the server is in fact first sent to a C-node. A separate issue is locating and selecting C-nodes so as to be "close" to clients, or according to other performance-related criteria. Sometimes it is possible to determine the appropriate C-node by human judgment or one-time network analysis and then fix the mapping from client to C-node: e.g. to manually configure each client's proxy setting as in the web proxy method. At other times, the determination of C-node proximity must be revisited frequently, because of congestion in the network that changes the network latency between two Internet locations, time-dependent bandwidth costs, changes in which C-nodes are currently operational, and other issues.

To revisit C-node proximity determinations, one can deploy one or more specialized computers or software systems that monitor web traffic on an ongoing basis, and such machines can build a "map" or model showing current network distances which can be used by a selector to choose an appropriate C-node for each client. Many mapping and monitoring systems are known to those skilled in the art. The following list is not intended to be complete, but merely to show some examples of these techniques, A preferred embodiment uses all the methods below in combination.

Measurements Taken From Representative Machines to C-Nodes.

A software program running on any machine in the network can measure the latency between itself and a second computer, for instance a C-node, by sending a short IP packet of a special form and measuring how long it takes for a response to return to the first computer (sometimes called "pinging" because of the standard UNIX program "ping" that does this), and can likewise measure bandwidth by measuring how long it takes to send a longer data stream of known length and dividing by transmission time. In addition other measurement schemes are well known. Thus, one may deploy such software at many locations in the Internet where each such location thought to be representative of a certain class of users. For instance such software located at an ISP's point-of-presence facility may be assumed to give measurements that would be representative of the ISP's users in that area. Each installation of this software will periodically measure the bandwidth and latency to each C-node (or some chosen collection of candidate C-nodes), and will periodically communicate its findings to a centralized "mapping" device which collates and analyzes the findings.

Measurements Taken From C-Nodes to Representative Machines.

C-nodes may also contain software as in the method described above, and measure the current network distance (in terms of latency, bandwidth, or other measures) between themselves and a specified collection of other computers or network devices (such as routers). This information is communicated to a mapping device as in the first mapping method.

Load and Availability of C-Nodes.

A mapping device may periodically query each C-node to find out if the C-node is still operational, and if so then to obtain a report from the C-node as to its current capacity and load. Alternatively, the C-nodes may periodically send such reports to the mapping device.

Source-Routed Network Measurements.

A mapping device or other computer can estimate bandwidth and latency between itself and a specified C-node by sending special packets as described in the first mapping method, but can flrthermore use "IP level source routing" to specify that these packets may go through a specified intermediary machine on their way to the C-node. This intermediary machine may be a client computer or a network node thought to be representative of a class of clients. The mapping device may make such estimates for more than one C-node. Since the distance between the mapping device and the chosen intermediary may be regarded as a constant independent of which C-node is being queried, the differences between these measures for different C-nodes can be used as an approximate measure for the distance between the intermediaries and the clients.

Routing Information.

Internet routers employ standard algorithms so that IP traffic can be sent from a source computer to a destination computer using an efficient path. As part of these algorithms, these routers maintain information about the topology of the Internet including heuristic measures of the distance between the router and certain other locations on the Internet. This information can be extracted and forwarded to a mapping device.

Map Analysis.

A mapping device may collect information as to the network distance between various pairs of computers, such estimates being obtained using any of the means just presented or other such means. The mapping device may also act as a collector of, and repository for, other information about the network and communication conditions, such as topology information obtained from routers and other sources, tables containing the cost of using various links (e.g. bandwidth charges), static information about nodes and computers (such as which C-nodes include caches), and so forth. Indeed, any information deemed relevant to the selection process could be collected and stored in such a device.

A mapping device may also analyze and organize the collected information in a variety of ways to make it more useful to a selector. For example, the mapping device may employ relational database technology to store the tables of network distances between pairs of computers, thus-making it easier for a selection process to issue complex queries against such tables and get very quick answers. As another example, a mapping device may keep track of the timeliness of the data it is storing, and initiate new measurements when they are needed to update particular data items or to fill in missing items. As yet another example, the mapping device may employ analysis algorithms to convert the raw (i.e. unprocessed) data it has into a more concise or useful form. To illustrate such analysis, the mapping device may use known "shortest path" and "spanning tree" algorithms. These algorithms are useful when the mapping device has raw (unprocessed) data which is a collection of pairwise computer-to-computer network distances. However, it is generally not feasible to obtain a direct measurement between every possible pair of computers. So the raw data will only contain measurements for some of the possible pairs, and yet it may be useful in the selection process if the mapping device can provide an estimate of the distance between any pair of computers and not just those for which a direct measurement was made. It is possible to infer (or make a heuristic estimate) of the network distance between a pair of computers for which direct estimates are not available. One strategy is to find a path containing one or more intermediate nodes that compares the two computers, such that each direct connection on the path has a measured network distance. An appropriate combination (e.g. the sum) of these distances over the entire path may be regarded as a measure of the distance between the end points on the path. If one considers all possible paths (or a representative sample thereof) between the end points, and then considers the shortest such path, this minimum path distance may be regarded as a reasonable estimate of the distance between the two endpoints.

Statistical Analysis.

C-nodes and S-nodes can monitor and record the download times and other aspects of communication performance for the transactions they carry. Thus, over time, they may build a historical database recording characteristics of prior transactions, and may sort this database according to the client involved, the server involved, or sort by the combination of client and server together. Standard statistical techniques and/or machine learning techniques can be employed using this historical data to build a model capable of summarizing this data and predicting future performance. For example, one aspect of this model may be to estimate the average communication time between a particular client and a particular C-node. This estimate may be used by the mapping software as a distance metric between that client and that C-node. When such estimates exist between a single client and multiple C-nodes, the mapping device may choose among C-nodes for that client by selecting the C-node with the lowest estimated average communication time (or download time.)

Using means such as those just described, a mapping device can maintain a current model of Internet proximity between certain computers, networks, or network devices such as routers, and nodes used by the invention (C-nodes and/or S-nodes). When a request from a client is received, a selector or selection process may use this model to select a C-node close to the client. The selector may be told the name or IP address of the client, and if this name or IP address is among those known to the device it can examine the list of C-nodes to choose the closest one. If the client is not directly known to the selector, the selector may instead select a known computer thought to be close to the client, and then choose an available C-node close to the chosen known computer. There are several ways to choose such a known computer, and two examples follow.

First, if the selector is provided with the domain name of the client, it may choose a known computer that shares the same top-level-domain. For instance, a client "site1.co.nz" is likely to be in New Zealand, so it may make sense to use a known computer "site2.co.nz" if such is available. Second, one can try to find a known nearby computer based on the analysis of IP addresses, for instance as follows. Version 4 IP addresses are represented as 32-bit numbers. The ranges of IP address are structured so that the high-order (most significant) bits in the address determine a particular network (e.g. a particular ethernet in a building) and lower-order bits determine which particular machine or host on that network is identified. The structure is further complicated, e.g. by the existence of sub-networks and the fact that the division between network parts and host parts does not occur after a fixed number of bits. It is usually true, however, that when two machines are connected to the same network or subnetwork then they are very close to each other in terms of most generally used network metrics. Thus, it is possible to compare the IP address of the client with the IP addresses of known computers and then, using knowledge of network structure, to choose a known computer on the same network as the client.

A quicker, somewhat rougher, version of the above approach uses the fact that the network numbers are defined by the high-order bits of the address. One may compare the IP address of the client with the IP addresses of known computers in order to find a known address that is a "best match" to the client's address, in the sense of having as many consecutive high-order bits as possible the same for both the client and the known computer. This heuristic technique may often choose a known computer on the same network or subnetwork as the client. In general, the problem of using a selector to find or guess a C-node close to specified client (or a C-node that satisfies other performance-related criteria instead of or in addition to proximity to the client) depends on the specific means employed by the mapping device or mapping system. The invention may be used together with any such means.

It is recognized that measuring network distances between computers on the Internet can, in some cases, be a difficult task to do well. Nevertheless, the present invention functions even if the mapping device uses very rough or heuristic methods to estimate distances and other relevant factors.

A second important practical issue is that, in some cases, it may not be possible to provide the selector with the exact identity of the client; for instance neither the client's name nor its IP address may be available. An important case where this occurs is with DNS redirection means. The current DNS system is hierarchical in nature, which can mean that one DNS server will query another in order to find a response. When a DNS server specially configured as suggested in the discussion of DNS redirection receives a request, the request is likely not to come directly from the client that initiated the request but rather to come from a "local" DNS server that was contacted by the client, and which relayed the request to the specialized server. In this case, the specialized DNS server may only see the IP address of the local DNS server and not of the client. In this particular case, it is reasonable to provide the selector with the IP address of the local DNS server instead of the client, because it is probable that the local DNS server is fairly close to the client. This illustrates one possible general response to the problem of providing the client identity to the selector, which is to substitute for the identity of the client the identity of another computer reasonably suspected of being close to the client.

However it may be deployed, the mapping device and selector can take into account other factors in addition to estimates of network proximity between C-nodes and the client. Some examples of such factors have already been given. In particular, important examples of such factors include estimates of the network proximity between each C-node and the target server, or between each C-node and the S-node(s) that may handle traffic for the target server. One justification is that such estimates, in appropriate combination with the C-node to client distance, may be used to estimate the total cost of communicating between client and server and it may be desirable to minimize the latter aggregate figure. This can be illustrated by the following more concrete example.

As discussed earlier, estimates of C-node to client distance in the form of bandwidth and latency figures can be obtained by standard techniques, such as "ping"ing to measure latency and timing transmission times to measure bandwidth. There are known statistical models for converting latency and bandwidth figures into estimates of the time to download typical web pages over the HTTP Protocol. One may estimate how communication between the client and the C-node contributes to aggregate download time between client and server. Second, one can deploy software at C-nodes and S-nodes that directly measure the time taken to process requests to a given server, and other software that uses this historical data to produce averages that estimate the contribution to typical download time between C-node and server (or instead, but similarly, between C-node and S-node). Finally, one may add the two estimates of download time to get an estimate of download time for the entire transaction. Or one may add the former estimate to some multiple less than one of the second estimate, where the multiple is chosen to account for the fraction of times in which the C-node can deliver the content to the client out of cache and therefore does not require additional communication. A variant of this example is to estimate three components of aggregate download time—client to C-node, C-node to S-node, and S-node to server—using similar techniques and then combine these.

The mapping methods discussed above and the subsequent discussion of mapping and selection have addressed the case where an explicit selection of C-node is made, e.g. by a specialized mapping device. A second technique that may be used, instead of such explicit selection means, uses IP routers to do implicit mapping and selection. IP routers include algorithms and techniques that attempt to find the shortest path between the source of a communication and the destination. Routing techniques are generally designed under the assumption that each IIP address corresponds to a unique machine. But it is possible to give the same IP address to many machines and, if very carefully managed, the existing routing algorithms will tend to send traffic to the closest machine with a particular address. This idea can be used in the invention if all C-nodes (or a subset of all C-nodes) are given the same IIP address. When used in conjunction with any of the redirection means discussed above, other than web proxy or transparent network interception, this means that it is sufficient to redirect traffic away from the server and towards the invention's C-nodes, but that the redirection can be towards a common IP address and does not need to explicitly select which C-node is closest to the client. Existing routing infrastructure can function as a node selector, automatically selecting and directing the traffic to a close C-node. This technique is sometimes called "anycast."

Figures 2, 3:
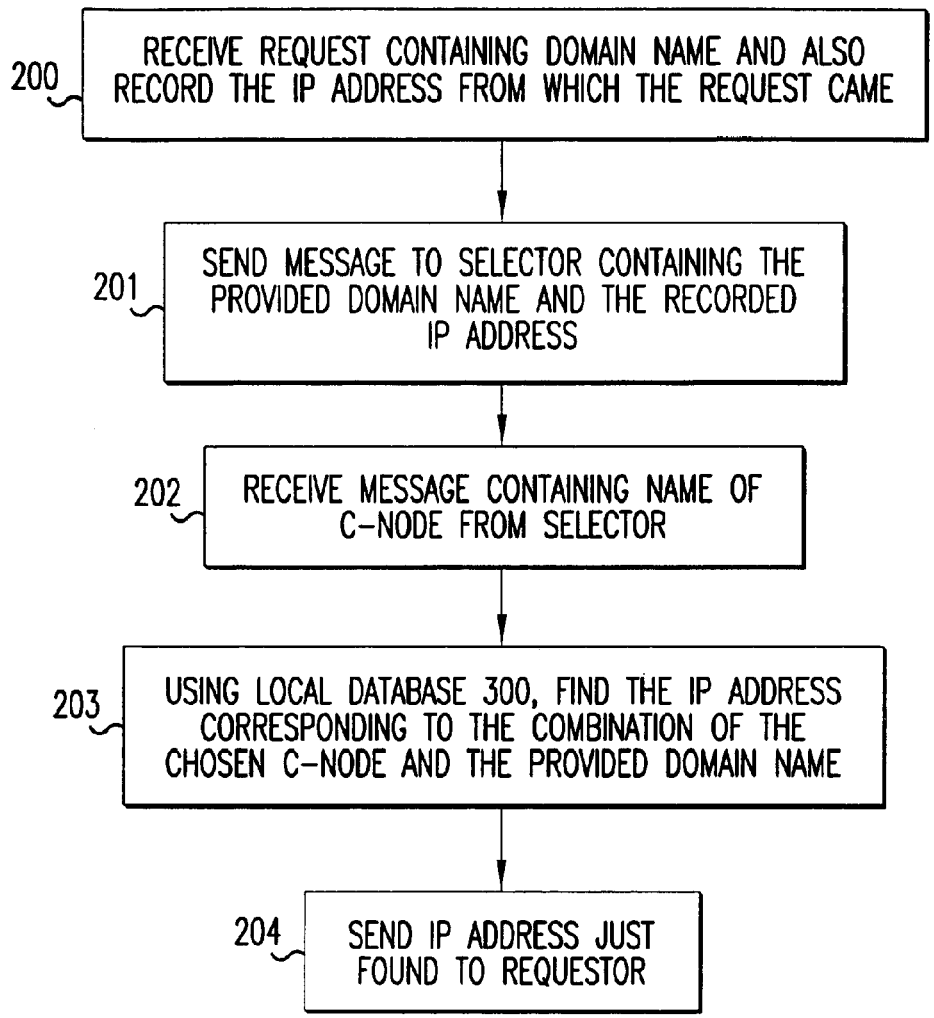
FIG. 2 is a flowchart of a process used by a redirection system in accordance with one embodiment of the invention.
FIG. 3 is an illustration of a data structure used by a redirection system in accordance with one embodiment of the invention.

As an example, one embodiment of DNS redirection as described above is further explained in conjunction with FIGS. 2 and 3. In the version of DNS redirection illustrated here, specialized DNS servers running custom software are situated in the Internet, and the DNS system itself is configured so that requests to resolve a server name (i.e. to find at least one corresponding IP address) are "delegated" to such customized servers. The DNS system is a complex, Internet-wide, distributed database comprising many different servers that communicate with each other and pass requests between them. This example should not be interpreted as the only way to use the DNS system as a redirection means. For instance, in the Content Distribution industry it is common to deploy a hierarchically organized set of custom servers, so that any one request is resolved only by the coordinated action of these servers. However, in this example a solution is shown that could be deployed with just one such specialized server.

FIG. 2 represents an overview of the steps taken by such a specialized DNS server, once it receives a request to translate a server name into an IP address (i.e. to resolve the server name). This request is received using the standard DNS protocol. The resolution process commences at step 200 when the request is received, in which the IP address of the requestor is also captured and recorded. (This may be the address of the client but, as discussed above, is often instead another DNS server more "local" to the client.) In step 201 the specialized DNS server sends an inquiry to a selector, and provides both the requestor's IP address and the server name. In step 202 it receives the response from the selector, which is the name of one C-node. The specialized DNS server consults a local database 300, as illustrated in FIG. 3, which associates each pairwise combination of C-node name 302 and server name 301 with an IP address 303 that is unique to that combination. In step 203 it uses this database 300 to select the IP address corresponding to the combination of the C-node name provided by the mapping device and the server name given in the original request. In this way, the C-node may be referred to using one of several different IP addresses, depending on which server name was requested; the reason for doing so is discussed subsequently. The selected IP address is then returned to the requestor in step 204 using the standardized DNS protocol.

Figure 4:
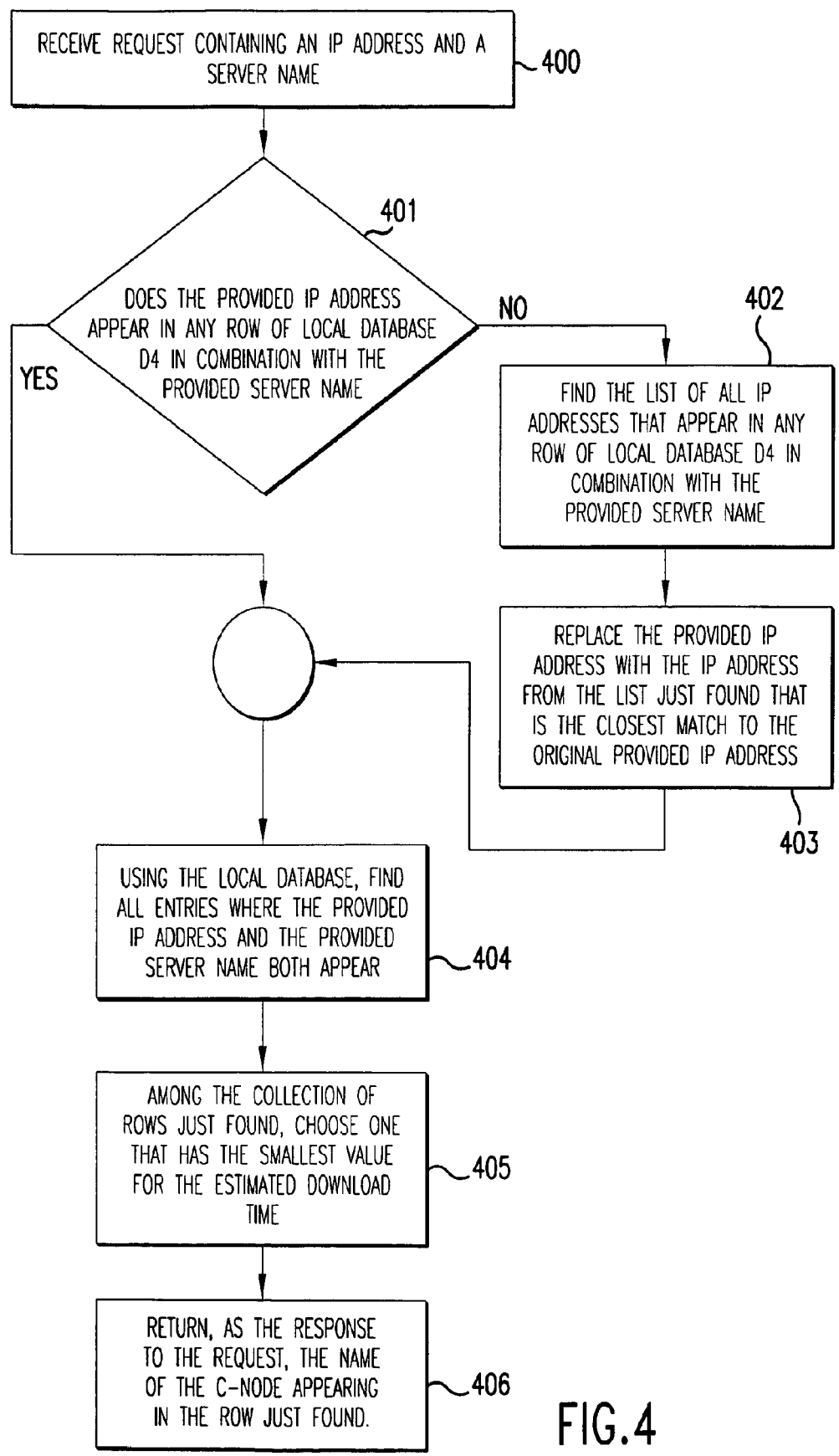
FIG. 4 is a flowchart of a process used by a selector in accordance with one embodiment of the invention.

As an example, one specific embodiment of a selector is further explained using FIGS. 4 and 5. FIG. 4 represents an overview of the steps taken by a selector when it receives, at step 400, a request containing an IP address and a server name, and is thus responsible for nominating a suitable C-node. In this illustration, it is assumed that the criteria for C-node selection is to minimize estimated aggregate download time. The selector utilizes a stored table or database such as database 500 illustrated in FIG. 5. This database 500 records an association between combinations of triples containing an IP address 501, a C-node name 502, and a server name 503, with the corresponding estimated download time. The estimated download time is the estimated time for a typical web transaction between a client at the indicated IP address and the indicated server, when the request is handled by the invention using the indicated C-node.

These database entries could be added manually, and the estimated download times can be based on an expert's best judgement. Alternatively, they may be based on data such as records of the time taken for prior transactions and on network measurement data such as bandwidth and latency, and computed using techniques discussed above. In this example, we consider the case where each individual C-node is responsible for compiling all estimated download times that relate to it, and periodically communicating these estimates, in the form of quadruples of the form [IP address, C-node name, server name, estimated download time], to the mapping device. A simple listening process on the selector receives such messages, and when it does so it updates database 500 using the content of the received message. In this example, this listening process on the selector that updates the database 500, combined with the action of the estimation processes attached to each C-node (FIG. 6, described below), can be viewed as a distributed mapping process. This is because these processes together create and correctly maintain the database 500 used by the selection process.

FIG. 4 does not specifically address the measurement and estimation process, or the simple listening process just discussed, but rather shows how the selector might use this information once collected. Because it is not usually feasible for database 500 to contain information specific to every individual IIP address, the mapping device must first check, in step 401, whether the provided IIP address is one of those for which information exists. If it is not, the device, in step 402, chooses an IP address for which information is known, and which matches the provided IP address as closely as possible using the technique discussed earlier. In this case, the chosen "best" match IP address is substituted for the original provided IP address in step 403. In step 404, database 500 is used again, to identify the collection of all entries in which the provided IP address and the provided server name appear in combination. In step 405, one row is selected from the collection of rows just found that has the smallest estimated download time. In step 406, the device extracts the name of the C-node that appears in the row just selected, and returns this name as the response to the original request.

Figure 6:
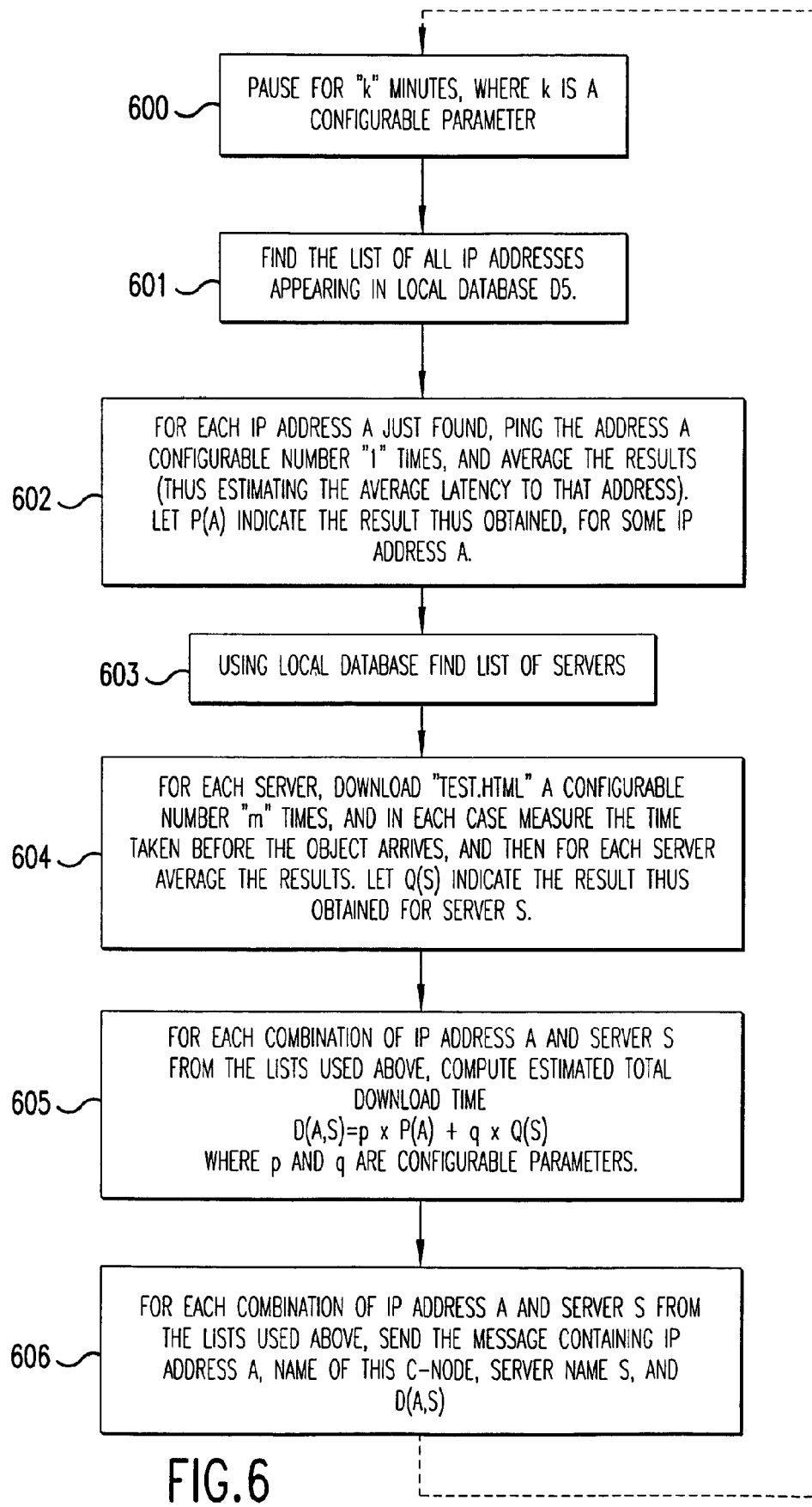
FIG. 6 is a flowchart of another process used by a mapping device in accordance with one embodiment of the invention.

As an extension to the previous example, FIG. 6 shows an example of a software process that may be deployed together with a C-node, perhaps executing on the same computer as the C-node, which estimates download times and then communicates these estimates to the listening process on the selector as discussed above. This process, illustrated in FIG. 6, runs in a loop so long as the C-node is operational, but pauses for a configurable time "k" minutes at step 600 before repeating the described steps. In step 601, the process consults a simple local database (not shown) to receive a fixed list of IP addresses. These IP addresses, which may be entered manually, are intended to be a collection of "representative" client computers. A criterion for inclusion is that these computers respond to the standard "ping" command, found on most computers running versions of either "UNIX" or "Windows" operating systems, which is used to measure the time a packet travels from the client to the computer and back. The process pings each IIP address in the list a configurable number "1" times, and averages the results, thus estimating latency between each IP address and the C-node itself (step 602). In step 603 the process consults a second database 700, shown in FIG. 7, to retrieve a list of server names known to the C-node. Then, for each such server, in step 604 the process attempts to retrieve a fixed web object used for test purposes from the server, and measures the time for the response to arrive. This test object may be referred to using a fixed URL, such as "test.html". This test object may be retrieved directly from the specified server, or may be fetched using an intermediate S-node. In either case each such test is performed a configurable number "m" times, and the results for each server are averaged so as to derive an estimate of download time between the C-node and the server. The process then considers each combination of IP address and server from the lists just considered, and for each combination applies a formula combining the estimated ping time between IP address and C-node with the estimated download time between C-node and server (step 605). An example of such a formula that may be used is "p" times the estimated ping time plus "q" times the estimated download time, where "p" and "q" are configurable numeric parameters that may be tuned manually. Finally, the process communicates the list of results just obtained, as quadruples of the form [IP address, C-node name, server name, estimated download time], to the listening process on the selector.

Operation of C-Nodes

The following discussion returns to description of other aspects of the invention, and assumes that redirection means have been employed so that the client's web request has been communicated to some C-node.

The invention includes specialized software and/or hardware that resides in the C-nodes. When the C-node receives a web request from a client, the node's software intercepts the request. The C-node includes software necessary to understand standardized web communication protocols, which today are most often versions of HTTP over TCP although the invention contemplates other protocols being used now and in the future. For example, Wireless Application Protocol (WAP) may soon become a standard communication protocol used when the client is a wireless telephone or other device communicating over wireless links.

In such manner, the C-node can interpret the request received from the client, and can also send acknowledgment messages to the client using the correct protocol so that the client knows that the request has been received.

The remaining software on the C-node is designed with the purpose of obtaining the requested content, if it is not already present at the C-node, and then communicating the response back to the client using any standardized protocol that the client can handle. This will usually be the same protocol that was used by the client to communicate the original request.

The C-node includes means for determining the identity of the web server or web site that contains the content necessary to satisfy the client's request. There are various means to achieve this, including the following two examples.

IP Address Sorting

The C-node may have multiple Internet Protocol addresses and Internet port numbers. It is the nature of Internet Protocol that the C-node will know the ports and IP addresses that were used to communicate with it (for both the C-node itself and the originator of the request). The C-node may maintain, for instance in a database, a mapping from IP addressees (and/or ports) to the actual web server containing the content. For example, if the redirection phase of the invention uses DNS direction, the DNS can be configured to return a different IP address depending on which servers name was queried. To illustrate, a query for "www.site.com" might return address 123.45.67.89, and for "www.othersite.com" may return address 156.78.90.12. Even though both addresses are alternative addresses for the same C-node, that C-node will thus be able to tell (depending on which address is connected to by) whether the original request was for "site" or "othersite".

In this method, the association between a particular IP address of the C-node and a server name may be static or dynamic. In the former case, the association changes infrequently and can be fixed (e.g., manually). In the latter case, the association changes relatively frequently in such a way that an IP address is allocated for a server only if there are requests for that server currently arriving at the C-node. Dynamic allocation requires careful management to determine which servers are (or are likely to soon be) the subject of requests through the C-node, and also requires careful and tightly synchronized coordination with the DNS system so that the DNS system and the C-node agree on the current meaning of each IP address. However, the advantage of a dynamic allocation scheme can be that fewer IP addresses are needed.

HTTP Protocol Information.

In certain circumstances the name of the server will be included in the HTTP header information, and the C-node can read this to determine the name of the server. The HTTP protocol provides this information in at least the following three circumstances: when the C-node is used as a proxy, as in web proxy redirection; when the client communicates using HTTP Version 1.1; and in most cases when an HTTP request is redirected to the C-node using HTTP redirection.

A C-node optionally uses a cache, which is a store of web content such as web pages and image files. If a web request can be satisfied using content in this cache then the C-node may use the cached content in forming its response to the client. There are many strategies for maintaining such a cache, and any can be adopted. The cache may be included as a part of the C-node or the device containing the C-node; for instance stored on a local hard disk or in memory. However, the cache need not be local to the C-node. There are known strategies in which a computer or node can query other caching nodes, to see if they are able to provide the requested content. The C-node may also employ such means, to determine if it is more efficient to contact the server itself (using the mechanism discussed subsequently) or to attempt to contact a cache. However, the following discussion assumes that the C-node was unable to satisfy the complete request out of its cache (or from any nearby cache.)

Having used such means to determine the ultimate source of the requested content (that is, the server) the C-node locates an S-node known to be close to the server. However, as discussed earlier, the choice of S-node may also take into account other factors, in particular performance-related factors, in addition to or instead of the proximity between S-node and server.

The invention's S-nodes are also located at chosen locations in the Internet. In particular, such locations may include being on the same premises or subnetwork as web servers, being at a commercial "co-location" facility for web servers, being at an ISP, being located on Internet backbone networks, or at backbone peering points. It is also possible that a program executing the functions of an S-node may be running on the same physical hardware as a web server itself, or even integrated with the web server software.

The C-node uses means to locate an S-node that is close to a specified web server. Examples of such means include the following. First the C-node may store, for instance in a database, a mapping from server name to the name or address of a suitable S-node. Alternatively, the C-node may include software or systems for monitoring network conditions, and thus building Internet proximity "maps" of the type discussed above for C-nodes, possibly using such methods as the mapping methods discussed above and related techniques. In this case, if the C-node has a list of all candidate S-nodes and knows the address of the server itself, it will be able to select an S-node close to the server. Combinations of these means, in which the database is used but is periodically updated with the results of network monitoring and mapping, may be used. It is also possible that separate machines or systems are responsible for maintaining the mapping from server names to the names (or addresses) of S-nodes, and that the C-nodes query one of these machines or systems. This querying may be done using DNS analogous to DNS redirection, described above, or by some other protocol. Yet another possibility is that each S-node maintains an up-to-date list of the servers that are close to it, and the S-node periodically causes this list to be communicated to each C-node so that C-nodes can maintain a database of S-node to server associations. Alternatively, a specialized system can maintain the current set of associations and cause this list to be periodically communicated to each C-node. There are many other means that might be employed, and in particular any redirection means that can be employed to chose C-nodes can easily be adapted, by one skilled in the art, to choose S-nodes as well.

In a different version of the invention, S-nodes are situated so that at least one S-node will intercept all traffic intended for a particular server. For example, the S-node may be located in the same physical device as the server, or on a gateway computer on the server's local physical network, or at the server's ISP, or even integrated with the same server software. When the S-node process is on the same machine as the server, the communication between the S-node process and the server may not involve any external network communication, but instead consist of a logical communication path internal to the machine. Such logical connections between two separate processes on one machine are well known to those familiar with the art, and are often called "loopback" connections. Aside from not traveling over an external network, communication between two processes using loopback connections is otherwise similar to regular network communication between processes on different machines, and can use the same protocols. When the S-node functionality is integrated with the server software, the need for a loopback connection may also be avoided. In this case, communication between the S-node part of the integrated software process and the server part of the software process simply refers to the steps in which the S-node part prepares data in the form expected by a server part—that is, compatible with the protocol forms expected by the server part—and then provides the prepared data to the server part.

Where the S-node is an interceptor, or is co-located with the server, a C-node need not identify the address of an S-node near the server. Rather, it can direct any communication it wants to have received by an S-node directly to the server's network address. The S-node will have the capability to intercept and examine all traffic to the server, and if the traffic is from a C-node then the S-node can intercept such traffic for special handling but otherwise pass traffic on to the server unchanged. In this variant, even though the C-node uses the server's network address, in fact communication from the C-node will be intercepted by an S-node.

Having chosen an S-node, either through explicit selection or through an implicit guarantee of interception, the C-node communicates the client's request to the chosen S-node, using a specialized protocol or combination of such protocols; hereafter these are referred to these as internode protocols. The purpose of such protocols is to provide enhanced performance, which may mean reduced cost, reduced bandwidth consumption, reduced latency, increased security, and other such advantages, or any combination thereof.

Example of a C-Node

Figure 8:
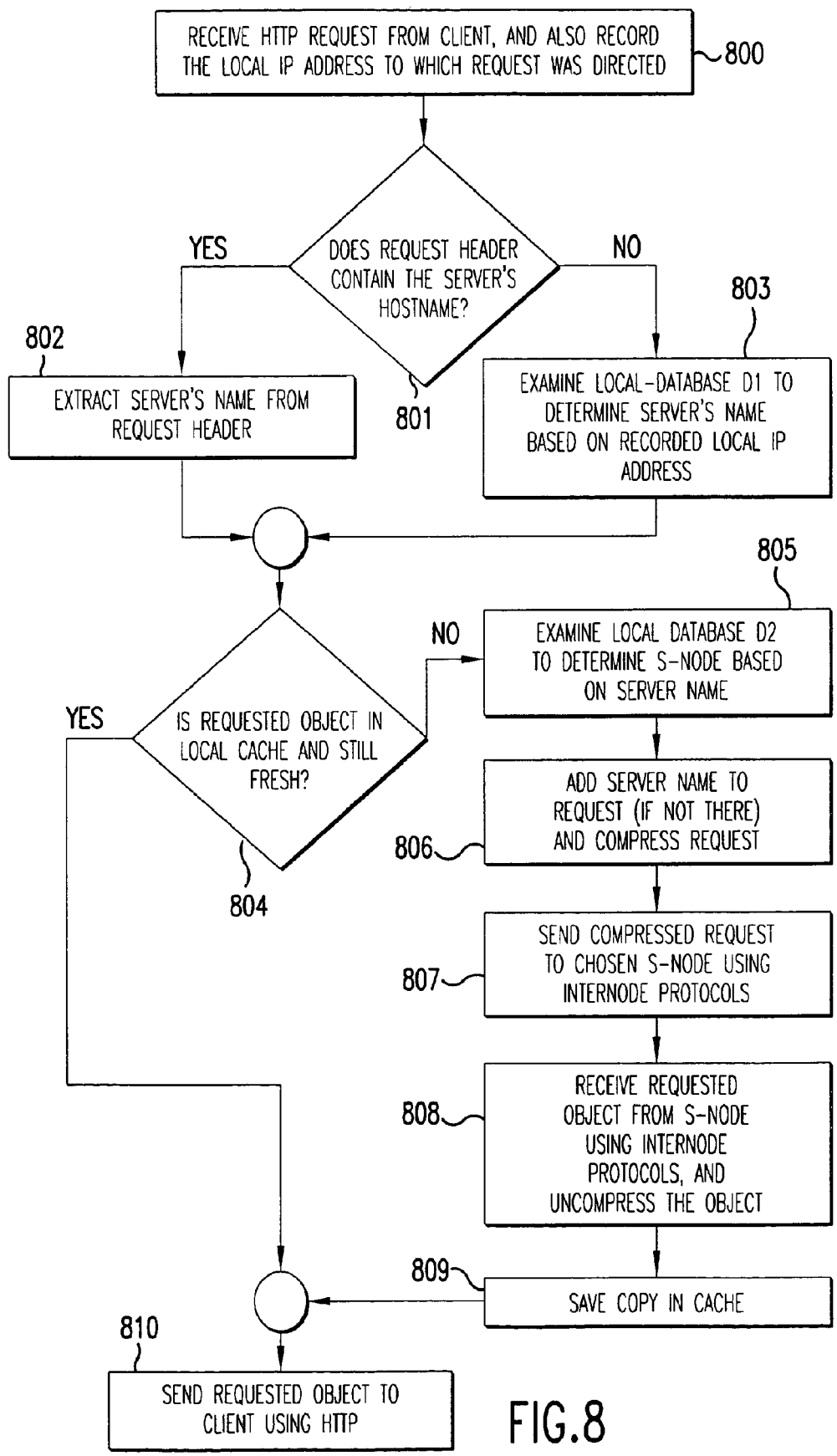
FIG. 8 is a flowchart of a process used by a C-node in accordance with one embodiment of the invention.
Figure 9:
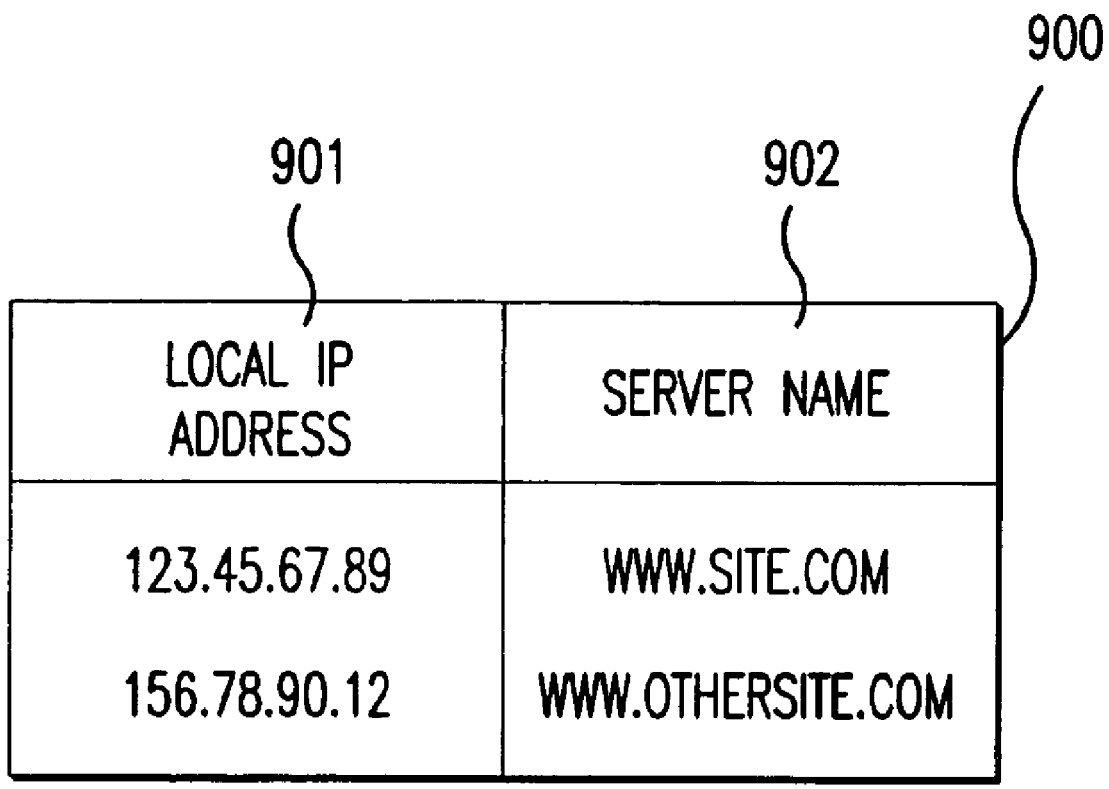
FIG. 9 is a data structure used by a C-node in accordance with one embodiment of the invention.

As an example, one embodiment of a C-node is further explained using FIGS. 3, 7, 8, and 9. FIG. 8 represents an overview of the steps taken by a C-node when it receives an HTTP request from a client, as in step 800. There may be more than one IP address that clients can use to communicate with the C-node. But it is possible, using common network technologies, to identify and record the IP address that was used to contact a machine, and the C-node does this, also in step 800. The C-node must now reconstruct the name of the server for which the request is intended. The C-node examines the HTTP request header, in step 801, and if the header contains the name of the server as discussed above for the HTTP Protocol Information technique, the C-node extracts this name from the header in step 802. Otherwise, it performs IP address sorting as described above, in step 803. Specifically, in this case it consults a local table or database such as database 900 in FIG. 9, which contains an association between IP addresses and server names. This table may be periodically maintained by a separate process, as discussed above, and in this example should be coordinated and kept consistent with a database such as database 300 in FIG. 3 that may be used by specialized DNS server.

The C-node inspects its cache, in step 804, to see if it holds a suitably fresh copy of the requested object which it can immediately return to the client in step 810. It will be appreciated that caching allows many known refinements and additions, which may be used here, but in this illustration we consider only a simple implementation of a cache. If the request cannot be answered using the cache, the C-node consults a table or database such as database 700 shown in FIG. 7. This table stores an association between each server name and the EP address of an S-node—that is, an S-node to which requests intended for the server may be sent. Such a table, and means for maintaining it, were discussed earlier. In step 805, the C-node uses database 700 to extract the IP address of an S-node corresponding to the server name found either in step 802 or step 803. In step 806, the C-node may use compressive means, for example the standard compression algorithm known as gzip, to compress the request. Also in step 806, the C-node adds the name of the server to the request header if it was not already present. In step 807, the C-node sends the request to the chosen S-node using one or more internode protocols as discussed later in this section. In particular, TCP for transactions (T/TCP), a standardized but rarely used protocol, may be employed. The C-node waits until it receives a response from the S-node, in step 808, again using one or more internode protocols such as T/TCP. The C-node may also uncompress the response, if the response arrives in compressed form. This response may be then stored in the C-node's cache, in step 809. It is also returned to the client, in step 810, completing the transaction.

Operation of S-Nodes

The S-node receives a request from a C-node using internode protocol(s). Other software on the S-node is designed with the purpose of obtaining the requested content from the server, if it is not already present at the S-node, and in either case communicating the response back to the C-node.

An S-node can also include an optional cache. If a web request can be satisfied, completely or partially, using content in this cache, the S-node may use the cached content in forming its response to the C-node.

Otherwise, the S-node will communicate with the server and request the content. Such communication is carried out using standardized protocols that the server is designed to use, and today this will generally be some version of HTTP over TCP.

Having then obtained the requested content, or other appropriate response to the original request, the S-node communicates this response back to the C-node again using some internode protocol or combination of such protocols designed for improved performance.

The C-node then forwards the response to the original requesting client. The C-node can be configured so that it waits to receive the full response from the S-node before sending it, or alternatively can be configured to send information as it arrives so that the first part of the response is sent to the client even before the C-node has received the whole response. This response is sent using a standard protocol acceptable to the client, which today will generally be a version of HTTP over TCP.

Example of an S-Node

Figure 10:
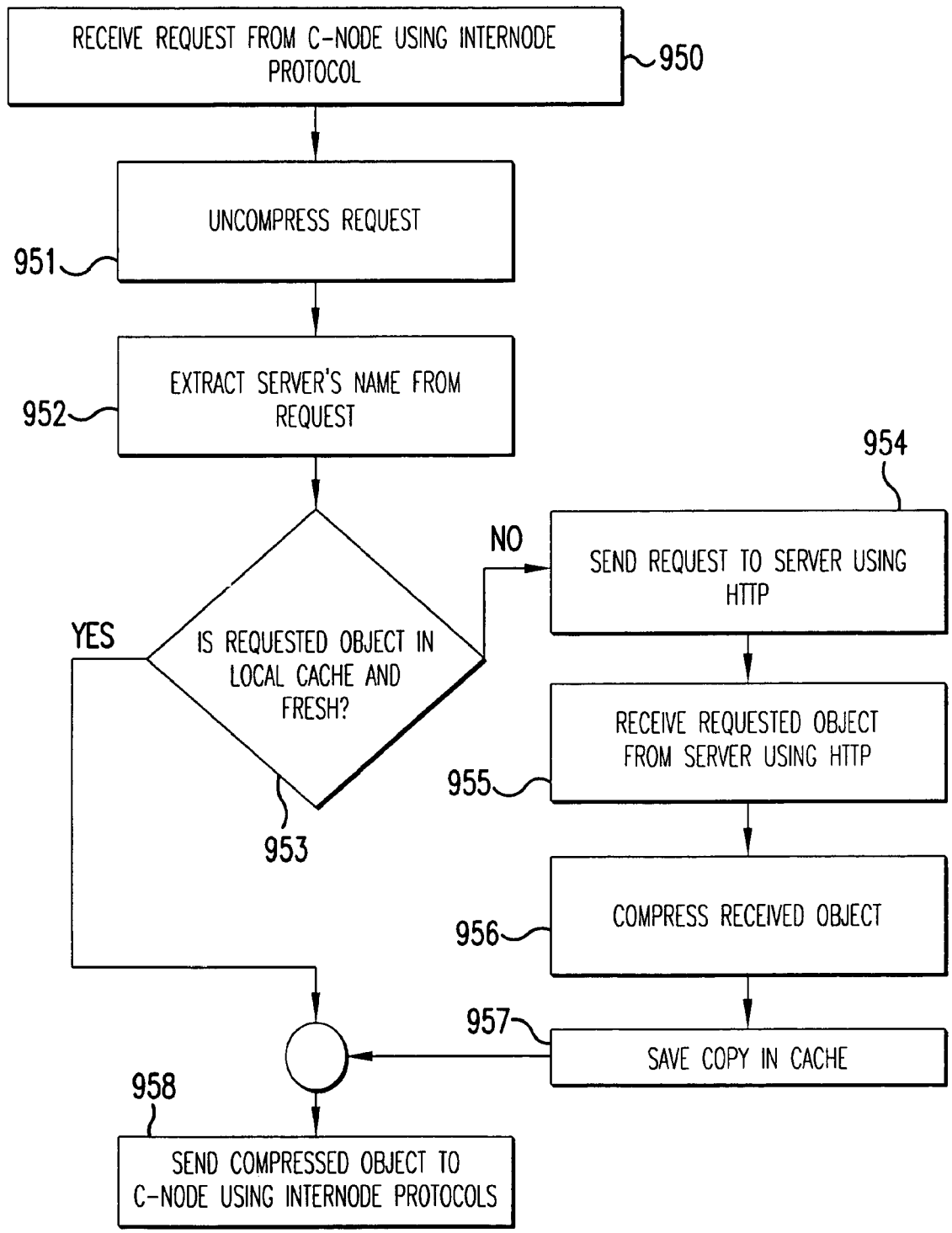
FIG. 10 is a flowchart of a process used by an S-node in accordance with one embodiment of the invention.

As an example, one specific embodiment of an S-node is further explained using FIG. 10. FIG. 10 represents an overview of the steps taken by a S-node when it receives a request from a C-node, as in step 950. The request is uncompressed, if necessary, in step 951, and then, in step 952, the server name is extracted from the request header. The S-node inspects its cache, in step 953, to see if it holds a suitably fresh copy which it can immediately return to the C-node. If the object is not found in cache, the S-node sends a request to the server using HTTP to retrieve the object, in step 954. In step 955 the S-node receives the response from the server, including the requested object. In step 956 the S-node may use compression means, such as the standard algorithm "gzip", to compress the response. It may then, in step 957, save the response it its cache. It then sends the response to the C-node using internode protocols, for instance T/TCP, in step 958.

Internode Protocols and Techniques

Many candidates exist for the internode protocols—that is, the higher-performance protocols that will be used between C-nodes and S-nodes. Several techniques are already known that could speed up Web communication, but which have not been widely deployed. The invention, however, is not limited to any particular such protocols, but contemplates continuing developments in this area. Following is a list of 11 such protocols.

Note that in some embodiments of the invention, C-nodes and S-nodes include software to communicate between each other for purposes other than directly responding to a request. In particular, the S-node may include software that attempts to predict in advance when a C-node might need a certain response, and in such cases the S-node can send the response to the C-node even without an explicit request from the C-node. The response is then available in the C-node's cache so that it can respond more quickly if it receives an appropriate request. One of the high-performance internode protocols discussed below, Predictive Content Pushing, illustrates this idea.

Connection Pooling.

Before any HTTP communication can take place, a TCP connection is usually established. There is an overhead delay in establishing such a connection, which is at least one round-trip-time (RTT): the time taken for a packet to travel from the source to destination and back. A second cost involved in establishing a TCP connection is that the connection begins sending data in a special mode, usually called "slow start" mode, as a congestion avoidance measure. The significant point is that, while in slow start mode, the sender must wait more often for an "acknowledgment" message from the recipient before it can send more data (i.e., additional packets). The delay caused by waiting for additional acknowledgments is usually proportional to RTT. As the name "slow start" indicates, performance while in this mode can be degraded. Only after a while, and in particular, after sufficient traffic has been sent, does the connection reach normal behavior.

In the present invention, pairs of C-nodes and S-nodes can maintain one or more open TCP connections between themselves for far longer duration than the length of a typical client/server HTTP interaction. Each such connection can be reused, first on behalf of one client, then another, and so forth. In this way, there is considerable savings in the number of times new connections must be opened between nodes and thus in the overhead of connection establishment. The technique of maintaining one or more open connections for a longer period of time, and multiplexing several shorter communication sessions onto a single long-lived connection, is called connection pooling and has been applied in other contexts.

Even when connection pooling is used as part of an internode protocol, the clients that communicate with the C-nodes may still need to open connections to the C-nodes on a frequent basis. However, since one C-node can deliver content to the client on behalf of many servers, it may also be possible for a client to keep its connections to the C-node open for longer than it would keep an open connection to any single server.

Likewise, the servers that communicate with S-nodes may still need to open connections to S-nodes on a frequent basis. However, since one S-node can manage requests to the server on behalf of many different clients, it may also be possible for a server to keep its connections to the S-node open for longer than it could keep an open connection to any client.

Even if there are frequent connection establishments between a C-node and a client, or between an S-node and a server, it is an important property of the invention that the network distances over which these connections are established are likely to be short in either case. As noted above, the overhead costs of TCP connection establishment depend on RTT, and hence on network distance. Connection pooling as an internode protocol avoids excessive connection establishment over the comparatively long network distance between a C-node and an S-node, where the savings are greatest. It will be appreciated that connection pooling can be used with other connection-oriented protocols aside from TCP.

Modifications to TCP.

Since TCP is widely believed to be an intrinsically inappropriate protocol for carrying HTTP traffic, there can be advantages to carrying HTTP either on an entirely different protocol or else on a modified version of TCP. Since the invention's C-nodes and S-nodes can be designed to use such proprietary or advanced protocols, any replacements for TCP or improvement to TCP can be used as internode protocols.

For example, T/TCP (Transaction TCP) is a standard protocol based on TCP, in which enough information is kept on each host to avoid or reduce startup costs, specifically three-way handshakes and slow start. Although not widely used in practice, software for T/TCP is readily available and could be used without modification as an internode protocol in the invention.

One skilled in the art will appreciate that there are many other known improvements and modifications. Further examples of commonly known improvements are: TCP with selective acknowledgments (TCP-SACK), TCP with large windows (TCP-LW), congestion prediction (as found, for instance, in the TCP-Vegas protocol), and TCP spoofing.

A broad class of improvements to TCP and other transport- or network-level protocols involves manipulating packet sizes. The performance of a packet-based protocol such as IP (and hence TCP or any other protocol carried over IP) can depend on the size of the packets sent, and the timing at which they are sent. One important factor is that, for performance reasons, it is important to keep the packet size less than the "Path Maximum Transfer Unit" (PMTU) which is defined as the largest packet size that can be carried over a link (i.e. path) without requiring fragmentation.

To avoid fragmentation, packets are often sized conservatively (i.e. less than PMTU) even where it would be better to use larger packets (albeit still less than PMTU). Between the C-nodes and S-nodes, one might dynamically monitor PMTU and seek to size packets optimally. In addition, packet size determination often does not take into account the application-level object boundaries. Yet it is possible to enhance performance with more intelligent packet sizing. One strategy is to choose packet sizes so that application-level objects (like web pages, web images, etc.) get split across as few packet boundaries as possible, and to try to combine multiple small objects into a single packet.

Yet another class of improvements to TCP and IP concerns packet timing. It is desirable to prevent "burstiness" (sending packets too closely spaced), and also to avoid packet loss caused when a sender sends packets in excess of a sublink's bandwidth. This can be accomplished if the sender is modified to learn about the transmission properties of a path, and then be restrained from sending out a burst of packets that might (even momentarily) exceed the capacity of some sublink. Instead, the sender should space the packets out more evenly by waiting for a calculated time between each. An alternative is where the receiver monitors network conditions. In TCP, the timing with which a receiver returns acknowledgment messages to the sender (ACK messages) influences the timing with which the sender sends subsequent packets. In this way, the receiver can influence the sender to space out packets more effectively. This is sometimes called TCP rate control. As those skilled in the art will appreciate, other techniques involving packet sizing and packet timing are possible, and are especially practical where one or both ends of the link can use non-standard software.

HTTP Header Compression.

The HTTP protocols include a header as part of every message, both requests and responses, in addition to any included content. This header is in readable, textual form and typically is several hundred bytes long. Many aspects of the header are very predictable, or excessively verbose, and could be conveyed in a more concise compressed form.

For example, a header often includes a field describing the length of the content, for instance including the line of text "Content-Length: 12345" if the content is 12345 bytes long. This could be compressed by including a short code known to signify the word "Content-Length" and by encoding the number 12345 in a 2 byte binary representation rather than as 5 separate characters.

As another example, the header often announces various characteristics of the client or server, such as the version of software it is running. This information does not need to be sent repeatedly. For example, if a C-node remembers the software version of each server, then the S-node need not include this item of information in every response that it conveys to the C-node. Instead, the C-node would be capable of reconstructing the necessary line of HTTP header just before conveying the response to the sender in HTTP. As those skilled in the art will appreciate, these are merely examples of the many ways in which HTTP headers might be compressed. In addition to compression techniques specific to HTIIP headers, standard text compression techniques can also be used.

The internode protocols may be using a modified version of HTTP in which all header information is compressed. Because fewer bytes are sent, performance will improve proportionately.

HYTP Content Compression.

The response messages sent from the S-node to the C-node, intended to be conveyed to the client, usually contain web content. Most such content can be compressed using standard algorithms appropriate to the content; for instance, text is often compressed using a standard algorithm called "gzip".

Direct communication between a client and server sometimes uses compression today. However, compression can only occur if the client and server can negotiate a compression method that both have software for, and if both client and server can afford the computational cost of performing decompression (or, respectively, compression).

Because C-nodes and S-nodes can be configured to run advanced compression software, and all can be configured with the same compression abilities, and may use hardware acceleration or other techniques to improve the speed of compression and decompression, they may use compression universally for all compressible web content. Our invention can use advanced web content compression techniques as an internode protocol, thus reducing the volume of traffic that is communicated between nodes and enhancing performance proportionately.

Predictive Prefetching.

A C-node may attempt to predict future requests that are likely to be made by a client, on the basis of requests it has already received. The most important instance of this occurs when a client receives an HTML page with references to embedded objects, which may be small images, small pieces of code in a scripting language such as a JavaScript, HTML style sheets, content to be placed into HTML frames, and others. Almost all client software in use today is configured by default to request these embedded images immediately, without waiting for user feedback of approval. A C-node that delivers the original page can predict, with extremely high confidence, that it will shortly receive requests from the same client for these embedded objects.

The invention can employ a software component that, based on the request received from a client or a response returned to a client, predicts other web objects that the client is likely to request in the near future. For such objects that are stored in the C-node's cache, the C-node may optionally send a request to the corresponding S-node or directly to the objects' server to verify whether the cached object is still fresh. For some or all of those such objects that are not stored in the C-node's cache, the C-node may send a request to the corresponding S-node to retrieve the objects. When the C-node receives the objects from the S-node, it may forward them to the client if a request has been received from the client in the meantime, or may store the objects in a cache in anticipation of such a request.

Predictive Content Pushing.

An S-node may also attempt to predict future requests that are likely to be made by a client, on the basis of requests it has already seen. The invention may use an internode protocol whereby the S-node, after obtaining responses to these predicted future requests, sends the predicted requests together with their responses to the C-node from which the original requests came. It is an important distinction from standard web protocols, such as HTTP, that in this internode protocol such responses are "pushed" from the S-node to the C-node even if the C-node has not made any explicit request for them.

The C-node understands the protocol of pushed web content and will receive the requests and responses sent by the S-node, and store these in its cache. If a client later makes one of the predicted requests then the C-node can respond promptly using the cached response.

This internode protocol is useful even if the C-node has a very small cache, capable of storing requests and responses for a few seconds or less. Thus it may require fewer resources, such as disk space or memory, than a traditional cache or Content Distribution node. Traditional caches and Content Distribution nodes get their content directly from web servers and communicate with a standard protocol such as HTTP, which cannot push content unless there is an explicit request for it. The use of a push internode protocol discussed here, in which a C-node's cache is populated when a S-node predicts requests likely to be made in the near future and pushes the responses to the C-node, is made possible using the invention's architecture comprising both C-nodes and S-nodes.

A variant of this protocol may be used for cache maintenance. When an S-node sees that the server has updated some content, for instance by noticing that an element in its own cache has become stale, it can push notification of this change (and the new version of the content) to all C-nodes that have the stale version.

Pipelining.

A requester of web content can send multiple requests to a server, one after another, on a single TCP connection without waiting for the response to one request coming back before sending the next request. The server should return responses in the same order as the requests are received, so that the client can match responses against requests. This process is called pipelining, and is known to be able provide significant performance gains. Very few web clients in use today support pipelining; many but not all web servers do so.

The invention can use an internode protocol that pipelines requests and responses between C-node and S-node, even if the client, the server, or neither can use pipelining themselves. For example, even non-pipelining browsers usually opens multiple connections to a given destination (such as a server or a C-node) and sends several requests simultaneously. The C-node can receive these simultaneous requests and pipeline them to the S-node along a single connection. If the server can handle pipelined requests, the S-node can then pipeline the request from the client (together perhaps with requests from other clients) to the server. Similarly, if a server cannot pipeline then an S-node can instead take a pipelined series of requests and multiplex them onto multiple TCP connections to the server, retrieve the responses in parallel from these multiple connections, and send them back to the C-node in pipelined fashion.

Delta-Encoding and Template Instantiation.

Many web pages, especially those that are dynamically generated, are largely similar to each other aside from minor changes. A common case is when the web page can be viewed as an unchanging template, customized in some way with user-specific data (for instance, a person's name).

One internode protocol is delta-encoding, in which the C-node has in its cache a first web object similar but not identical to the second web object which is the one requested. The S-node can retrieve the second object from its cache or from the server, and extract some representation of the difference (delta) between the two objects with such representation being more concise than either. The S-node communicates the delta representation to the C node, which combines it with the first object it has cached to reconstruct the requested second object, which is then communicated to the client. In this way, fewer bytes are communicated between the S-node and the C-node.

A variant of this internode protocol is template instantiation, in which the S-node analyses a web object and separates the object into two parts, called the template and the customization data, such that the original object can be constructed from the two parts. (Alternatively, the server itself may define this separation.) The S-node communicates both the template and the customization data to the C-node, and instructs the C-node to keep the former in cache. When the S-node needs to send another object to the C-node with the same template but with different customization data, it may instead send a short code designating the template, together with the customization data. The C-node then constructs the original page and communicates this page to the client.

Delta-Encoding Using S-Node Caching.

This internode protocol requires the S-node to have a cache storing certain requests and responses it has delivered. The distinctive features operate when the S-node receives a request for a second object, say obj2, that may be identical to a first object, say obj1, that is already in the S-node's cache, or may be very similar but not identical to such a cached object obj1, but such that it is not known for certain what the differences between the obj1 and obj2 are, if any. For example, one such case is if the requested object is identified using the same URL as the object stored in the cache, but the corresponding object may have been updated in the server and so the cached object is at risk of being stale. Another common case is when the URL is different from that of the cached object, but the differences only occur after the presence of a question mark "?", since by convention it is likely that the two objects are the output of the same cgi-bin program used with different parameters and may thus be substantially similar.

The S-node communicates obj1 from the cache to the C-node as soon as it receives the request together with an indication that the C-node should not deliver obj1 to the client but rather keep it in temporary storage. The S-node simultaneously requests the desired object obj2 from the server. When the S-node receives obj2, it compares it with obj I and determines whether they are different. If they are not different, the S-node sends a short message to the C-node informing the C-node to send the object held by the C-node in temporary storage (i.e. obj1) to the client. If they are different, the S-node may send obj2 in its entirety to the C-node, so that when the C-node receives it the C-node sends the obj2 to the client and discards the first object held in temporary storage. Alternatively, if they are different, the S-node may send to the C-node some representation of the difference between obj1 and obj2, so that the C-node can combine this representation with the first object held in temporary storage, to recover the second object and then send it to the client.

This internode protocol does not reduce the net volume of the traffic communicated over the Internet, and does not involve caching a similar object to, the one requested near the client in anticipation of a request. However, this protocol can reduce the latency until the client receives the requested object, because the first object is communicated to the C-node even while the server is still working to evaluate the request and while the server is in the process of sending the response to the S-node. If it turns out that the first object is identical to the second object or has only a small difference to it, the S-node needs send only a short, and thus fast, communication to the C-node before the C-node can send a response to the client.

Error Correcting Codes.

Transmissions over the Internet frequently incur errors, notably packets that get lost and are not delivered to the recipient. In this case, the sender should eventually notice that the packet was not received; usually either by failure to receive an acknowledgment from the intended recipient within a specified time, or when the recipient sends notification that the packet did not arrive. The sender can then resend the packet. The process of noticing that an error has occurred, and then resending the packet can take substantial time; during this time the recipient must wait because it does not yet have all the packets constituting the entire message.

To enhance performance the sender may send additional packets of information, redundant with the packets containing the request or the response, such that these additional packets may allow the recipient to recover the full message immediately even if one or more packets are lost. These additional packets may be sent simultaneously with, or very shortly after, sending the packets constituting the message itself Such additional packets may employ the standard means of error correcting codes and "erasure" codes.

Intelligent Routing.

When an IP messages (including TCP communication sent over IP) are sent over the Internet, devices called routers are usually responsible for ensuring that the packets in the message reach their destination correctly and (it is hoped) efficiently. The sender and recipient of such messages usually do not need to explicitly request or manage this routing process. However, it can be possible to gain enhanced performance and reliability by managing or influencing routing explicitly. The invention may, for example, maintain two TCP connections between a given S-node and a given C-node, such that these two connections take different paths through the Internet even though the ultimate source and destination of the connection (i.e., the S-node and C-node) are the same. In case communication over one connection becomes inefficient (for example, a router on the connection's path is temporarily congested) the invention may quickly re-send traffic over the second connection.

A specific way of achieving this is to use the "source routing" option which is part of the standard IP protocol. This allows one to force packets to travel a particular route from source to destination, or to force the packets to pass through one or more designated intermediate nodes (such as routers). Two connections from the same source to the same destination may thus be influenced to take different paths. Another way of creating distinct paths occurs when one node (e.g. a C-node or S-node) has multiple network interface cards (NICs) connected to different networks. When such a node sends a message, it may designate which of the NICs is used and thus determine at least the first sublink used in such communication. As those skilled in the art will appreciate, these are just illustrative of the means by which the specific path taken by a communication may be influenced and controlled. This example is merely illustrative of the many ways in which one may manage or influence the routing process to improve performance.

Figure 11:
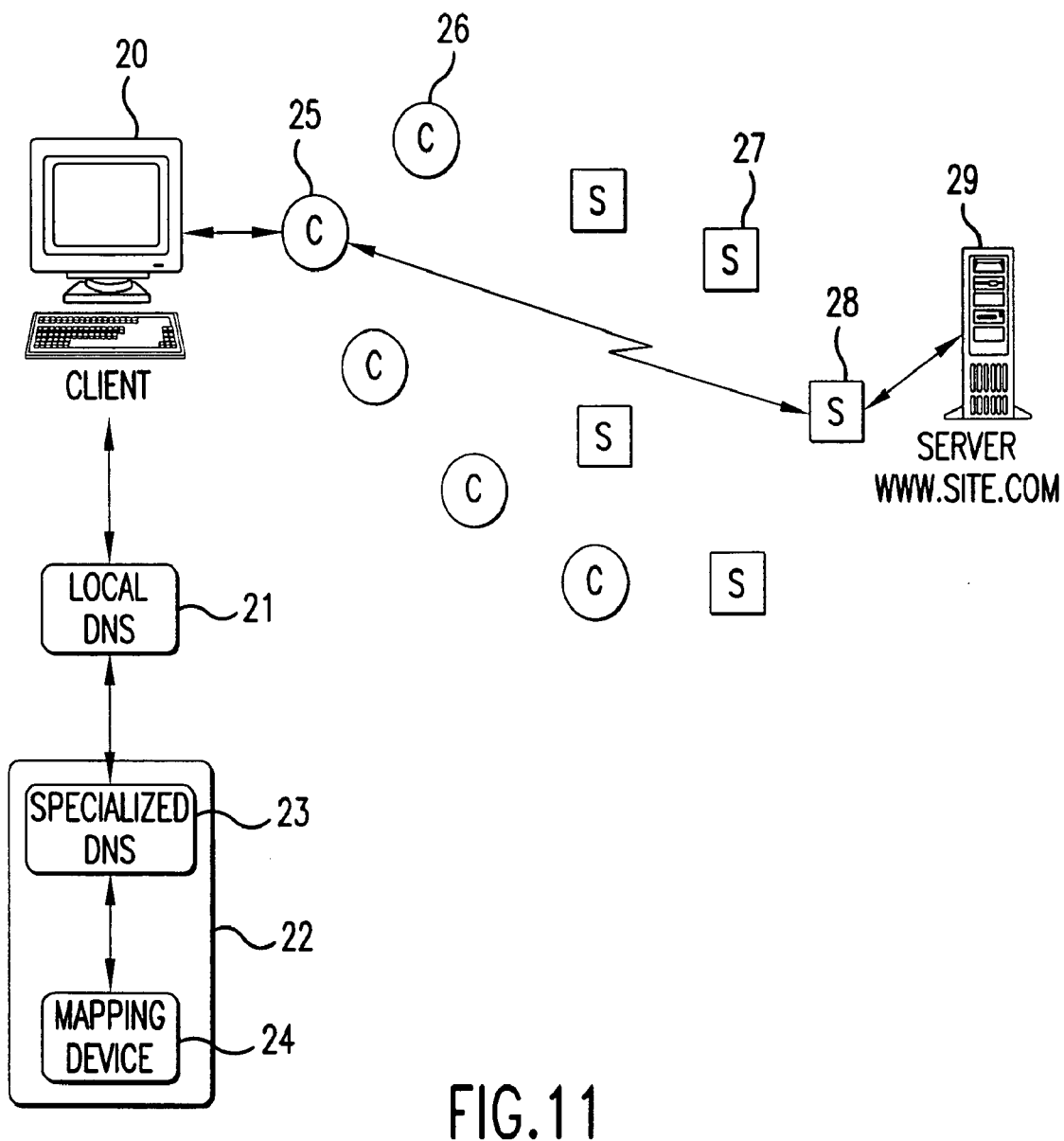
FIG. 11 is a block diagram of a system for providing improved communications performance in a network in accordance with a preferred embodiment of the invention.

A preferred embodiment of the invention is further illustrated in FIG. 11. C-nodes 25 and 26, and S-nodes 27 and 28 are deployed at different locations in the Internet as described earlier. This embodiment uses DNS-based redirection method in conjunction with network mapping, employing at least measurements taken from C-nodes to representative machines. The selector and mapping device 24 is software running on the same machine 22 as specialized DNS server software 23. Client 20 wishes to request content from server 29, which in the figure is named www.site.com.

Client 20 consults its local DNS server 21 in order to find an IP address corresponding to the name www.site.com. Local DNS server 21 relays the request to specialized DNS server 23. DNS server 23 will learn, as part of the query, local DNS server's 21 IP address. The DNS server 23 consults the mapping device 24, and the mapping device 24 then uses the requestor's address and its network maps to choose a C-node that minimizes network distance between the provided IP address and the chosen C-node (and hence, the chosen C-node is likely to be near client 20). As discussed earlier, and illustrated in FIGS. 4 and 6, additional factors can also be taken into account in the choice of C-node. In FIG. 11, C-node 25 is chosen by the selector.

This embodiment uses the IP address sorting method. Accordingly, each C-node, and in particular C-node 25, is given multiple IP addresses, one corresponding to each possible server name. DNS system 23 returns an IP address for C-node 25 corresponding to the server name www.site.com. DNS server 23 returns this IP address to local DNS server 21, which relays the response to client 20. Client 20 opens a TCP connection, using the provided address, to C-node 25, and then communicates its request using HTTP over the TCP connection. C-node 25 records the IP address on which the connection was opened, and uses IP address sorting to reconstruct the name of the server 29, i.e. www.site.com, to which client 20's request was intended. C-node 25 may attempt to find the requested object in its cache and return the object immediately to client 20. Otherwise, C-node 25 uses a database of server to S-node associations to discover the name of an S-node that can carry traffic to server 29. Here, S-node 28 has previously been associated with server's 29 name, i.e. with www.site.com, and is chosen. C-node 25 sends the request to S-node 28 using internode protocols.

The internode protocols used between C-node 25 and S-node 28 will replace TCP with a faster protocol, in this preferred embodiment, T/TCP. In addition, HTTP Header compression, HTTP content compression, Predictive Content Pushing, and Delta-encoding may be used simultaneously as internode protocols. S-node 28 receives the request using the internode protocols, and forwards the request to server 29 using HTTP over a TCP connection that S-node 28 has opened to server 29. S-node 28 then receives the response to the request from server 29, again using HTTP over TCP. S-node 28 sends the response to C-node 25 using internode protocols. C-node 25 forwards the response to the client using HTTP. This embodiment may be further explained using FIGS. 2 to 10 and the previous discussions concerning these figures.

It will be appreciated that, although the invention has been described in terms of a request being sent from client to server and a response being sent back, the invention may be adapted to enhance performance for either request or response alone. Further, there is no requirement that the internode protocols used to communicate from S-node to C-node be the same as those used in the reverse direction. An example of how the invention may be used in only one direction is as follows. A client may send its request to the server, and the server may be configured so that all such requests are intercepted by an S-node close to the server. In this role, the S-node is functioning as a "reverse proxy" which is a well-known technology. However, after the S-node has retrieved the response to the client's request (either from the S-node's cache or from the server), the S-node may select a C-node thought to be close to the client (e.g. by using network mapping means as described earlier). The S-node may then communicate the response to the chosen C-node using efficient internode protocols. The chosen C-node may then send the response to the client using standard protocols. If the standard protocol used between C-node and client uses TCP, the C-node may have to "masquerade" its communications so that they appear, to the client, to come from the S-node directly; however techniques for masquerading TCP communication in this fashion are well-known. Thus, in this example, the invention is primarily employed for only one half of the communication, i.e. is used when returning a response from the server to client but not necessarily for sending the client's initial request to the server. An advantage of employing the invention as in this example is it avoids the need for redirection means to ensure that a client's request be sent to a close by C-node.

Alternative Embodiments

The foregoing descriptions of specific embodiments of the present invention are presented for the purposes of illustration and description. They are not intended to be exhaustive or to limit the invention to the precise forms disclosed. Many modifications and variations will be evident in view of the above teachings. The embodiments were chosen and described in order to best explain the principles of the invention and its practical applications, to thereby enable various embodiments with various modifications as are suited to the particular use contemplated. For example, the functions of S-node and C-node have been differentiated in termsof the role they play in handling request and response. It will be appreciated, however, that one device such as a computer or cluster of computers may embody both functions.

As another example, the embodiments described provide increased communications performance in both transmission directions—that is, from the source to the destination and vice-versa. In an alternative embodiment, the invention may provide increased performance in one direction only, or for certain packets or messages only. For example, a request for web content may be sent by a client to a server, with selection of a C-node and an S-node being made, and these nodes being used for communication, but using a standard protocol for the sub-link between the C-node and the S-node. The response from the web server may use the same path—that is, the same C-node and S-node—but use a high-performance protocol between the S-node and the C-node.

What is claimed is:

1. A method for communicating between a source and a destination over the Internet, comprising:

selecting one of a plurality of nodes of a first type by the following sub-steps:
receiving a DNS request at a first specialized domain name server;
resolving, by the first specialized domain name server, the DNS request to an IP address of one of the plurality of nodes of a first type based on network mapping information; and
communicating, by the first specialized domain name server, the IP address of the node of a first type to the source;

selecting one of a plurality of nodes of a second type by the following sub-steps:
receiving a DNS reguest at a second specialized domain name server;
resolving, by the second specialized domain name server, the DNS request to an IP address of one of the plurality of nodes of a second type based on network mapping information: and
communicating, by the second specialized domain name server, the IP address of the node of a second type to the selected node of a first type;

receiving a request for content from the source at the selected node of a first type, wherein the request for content was transmitted in accordance with a first protocol that is a standard TCP over IP protocol;

transmitting the request for content from the selected node of a first type to the selected node of a second type, wherein the request for content was transmitted in accordance with an internode protocol that is a modified TCP over IP protocol, wherein the internode protocol, as compared to the standard TCP over IP protocol, provides a higher performance over a sub-link between the selected node of a first type and the selected node of a second type; and transmitting the request for content from the selected node of a second type to the destination, wherein communicating the request for content from the source to the destination is an end-to-end transmission, and communicating the request for content from the source to the destination via the selected node of a first type maximizes performance of the end-to-end communication by optimizing a measure of communications performance for a sub-link between the source and the selected node of a first type and by using the internode protocol over the sub-link between the selected node of a first type and the selected node of a second type.

2. The method of claim 1, further comprising:
receiving requested content from the destination at the selected node of a second type;
receiving the requested content from the selected node of a second type at the selected node of a first type, wherein the requested content was transmitted by the selected node of a second type in accordance with the internode protocol; and
transmitting the requested content to the source from the selected node of a first type in accordance with the first protocol.

3. The method of claim 1, wherein the selected node of a second type is co-located with the destination.

4. The method of claim 1, wherein selecting one of a plurality of nodes of a first type further includes
receiving the DNS request at a local name server and forwarding the DNS request to the first specialized domain name server; and
forwarding the IP address of the node of a first type to the local name server for communication to the source.

5. The method of claim 1, wherein the specialized domain name server is co-located with one of the plurality of nodes of a first type.

6. The method of claim 1, wherein the network mapping information is collected by a mapping device.

7. The method of claim 1, wherein the mapping device is co-located with one of the plurality of nodes of a first type.

8. The method of claim 1, wherein the request for content is transmitted from the selected node of a second type to the destination in accordance with a third protocol.

9. The method of claim 8, wherein the first protocol and the third protocol are the same protocol.

10. The method of 1, wherein the internode protocol is an HTTP application layer protocol overlaying the modified TCP over IP protocol.

* * * * *